United States Patent
Takaoka et al.

[11] Patent Number: 5,881,168
[45] Date of Patent: Mar. 9, 1999

[54] IMAGE PROCESSING APPARATUS METHOD AND SYSTEM FOR CONVERTING CHARACTER CODES OF CHARACTER IMAGES EXTRACTED FROM AN ORIGINAL IMAGE AND POSITIONS OF THE IMAGES FOR TRANSMISSION

[75] Inventors: Makoto Takaoka, Yokohama; Shugoro Ueno, Tokyo, both of Japan

[73] Assignee: Canon Kabushiki Kaisha, Tokyo, Japan

[21] Appl. No.: 419,052

[22] Filed: Apr. 7, 1995

Related U.S. Application Data

[63] Continuation of Ser. No. 43,474, Mar. 30, 1993, abandoned.

[30] Foreign Application Priority Data

Mar. 30, 1992 [JP] Japan .................................. 4-073758
Feb. 19, 1993 [JP] Japan .................................. 5-030868

[51] Int. Cl.⁶ .............................. G06K 9/00; H04N 1/38
[52] U.S. Cl. .......................... 382/180; 382/292; 382/173; 358/467; 358/426
[58] Field of Search .................................. 358/467, 462, 358/470, 448, 426, 453, 540, 450, 468; 395/117, 110, 114, 115; 382/180, 176, 169, 321, 392; 235/167, 168, 173

[56] References Cited

U.S. PATENT DOCUMENTS

| | | | |
|---|---|---|---|
| 4,414,579 | 11/1983 | Dattilo et al. | 358/467 |
| 4,499,596 | 2/1985 | Casey et al. | 358/467 |
| 4,503,556 | 3/1985 | Scherl et al. | 382/9 |
| 4,614,978 | 9/1986 | Doster et al. | 358/470 |
| 4,684,997 | 8/1987 | Romeo et al. | 358/470 |
| 4,949,188 | 8/1990 | Sato | 358/462 |
| 5,001,576 | 3/1991 | Tanaka et al. | 358/462 |
| 5,041,918 | 8/1991 | Ishida et al. | 358/442 |
| 5,138,465 | 8/1992 | Ng et al. | 358/467 |
| 5,177,795 | 1/1993 | Tanioka et al. | 358/462 |
| 5,191,612 | 3/1993 | Katsuyama et al. | 358/462 |
| 5,212,741 | 5/1993 | Braski et al. | 382/169 |
| 5,235,436 | 8/1993 | Sakamoto | 358/467 |
| 5,235,654 | 8/1993 | Anderson et al. | 382/180 |
| 5,247,591 | 9/1993 | Baran | 358/440 |
| 5,268,770 | 12/1993 | Yukino | 358/442 |
| 5,270,837 | 12/1993 | Chen et al. | 358/467 |
| 5,276,531 | 1/1994 | Chen et al. | 358/467 |
| 5,282,062 | 1/1994 | Ohara et al. | 358/467 |
| 5,363,214 | 11/1994 | Johnson | 358/462 |
| 5,369,508 | 11/1994 | Lech et al. | 358/467 |

FOREIGN PATENT DOCUMENTS

| | | | |
|---|---|---|---|
| 67244 | 12/1982 | European Pat. Off. | G06K 9/32 |
| 93244 | 11/1983 | European Pat. Off. | H04N 1/41 |
| 0262801 | 4/1988 | European Pat. Off. | |

OTHER PUBLICATIONS

Patent Abstracts of Japan, vol. 16, No. 142 (E–1187) (Kokai 4–000864), Jan. 1992.

Patent Abstracts of Japan, vol. 16, No. 166 (E–1193) (Kokai 4–013369), Apr. 1992.

Dvonch et al., "Color Descriptors in Page Description Languages", Proceedings of the Society for Information Display, vol. 30, No. 3 (1989).

IBM Technical Disclosure Bulletin, Jan. 1991, vol. 33, "Integrated Data Object Content Architecture Description".

*Primary Examiner*—Edward L. Coles
*Assistant Examiner*—Cheukfan Lee
*Attorney, Agent, or Firm*—Fitzpatric, Cella, Harper & Scinto

[57] ABSTRACT

A server is connected to an Ethernet port via a network and is further connected to a copier via video interface ports. The server is capable of subjecting image data read in by the copier or obtained from the network to processing for character recognition, coding and translation by a character recognition circuit, image coding/decoding circuit and translating circuit. Furthermore, image data is capable of being generated by a page-description-language interpreter based upon data, which is in the format of page description language, received from the network. Conversely, a character in the image data is capable of being recognized, coded and converted into page description language so that the amount of data sent to the network can be reduced.

36 Claims, 34 Drawing Sheets

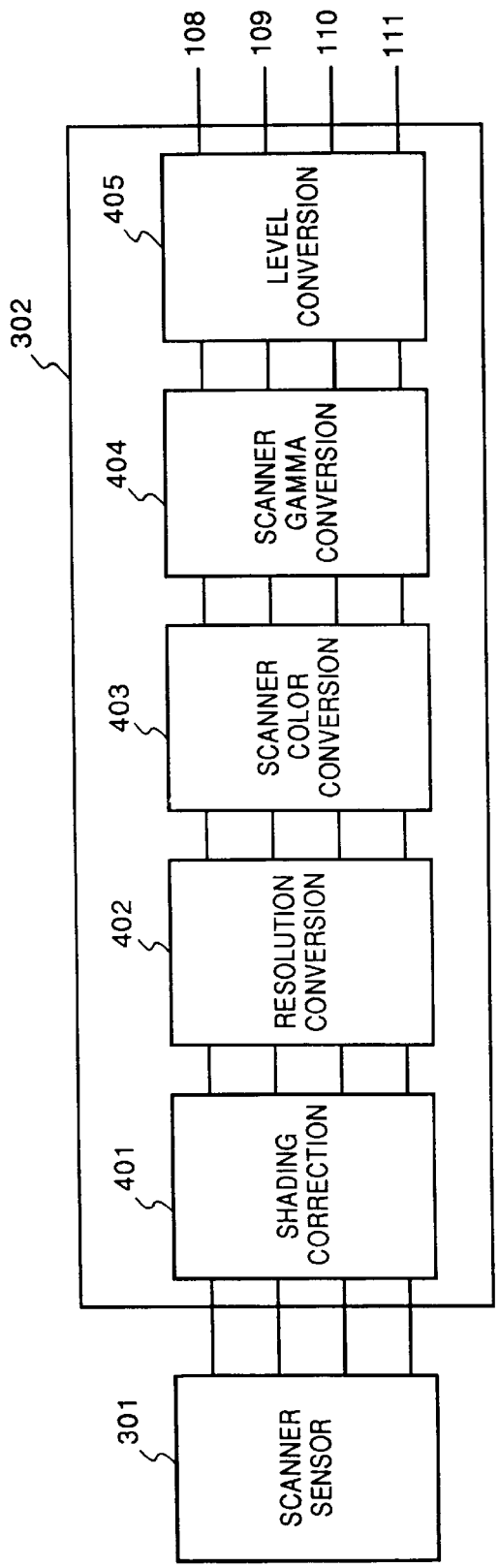

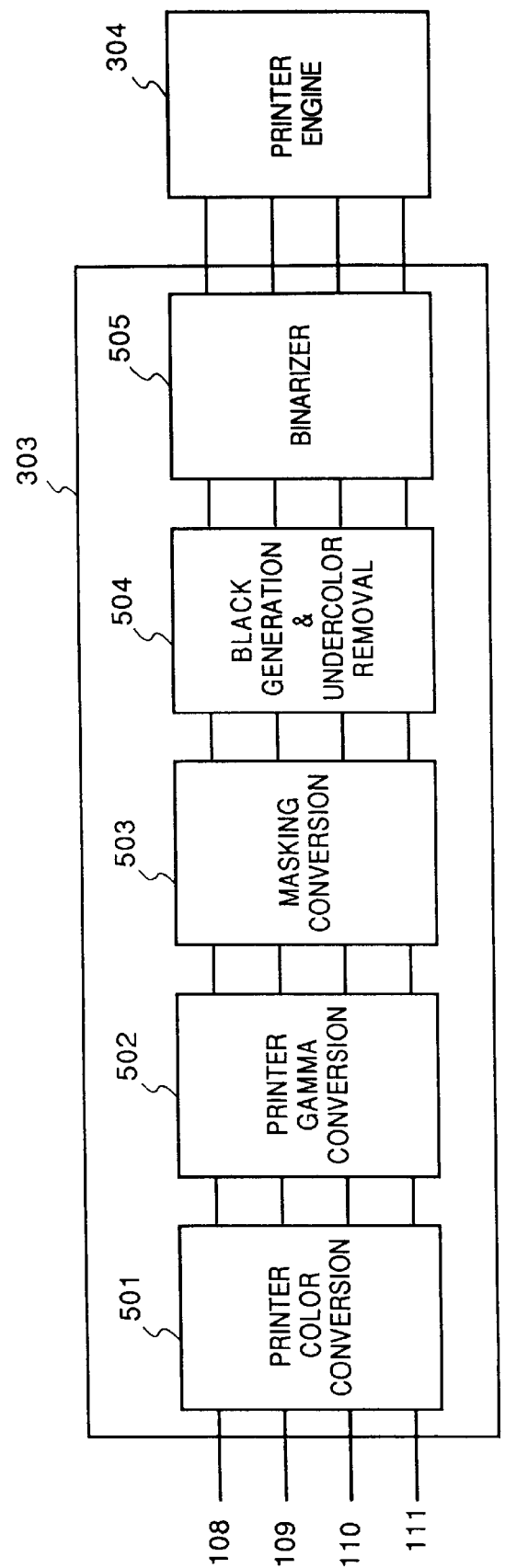

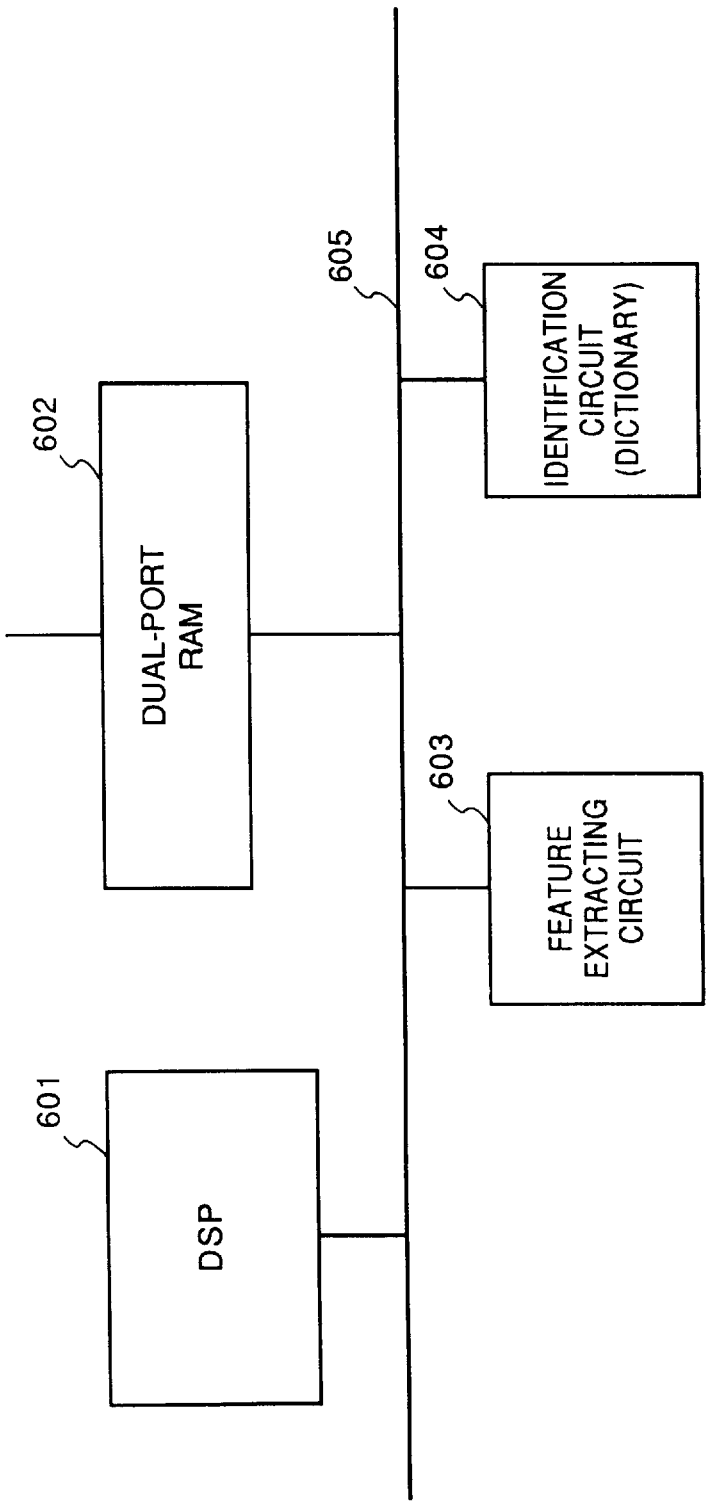

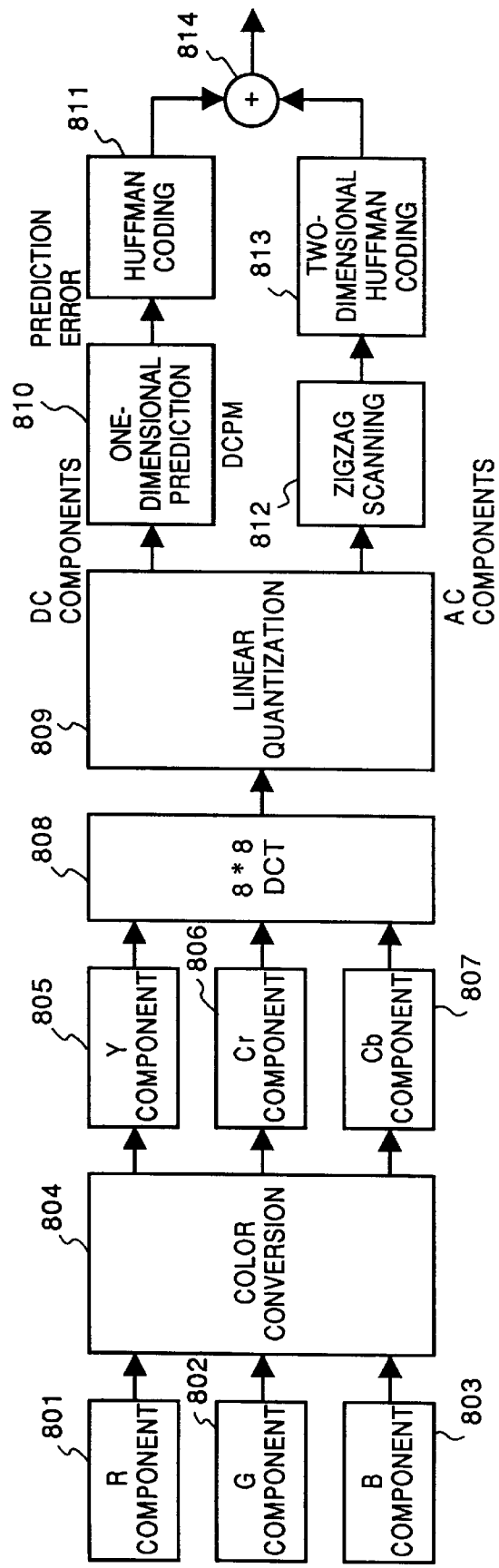

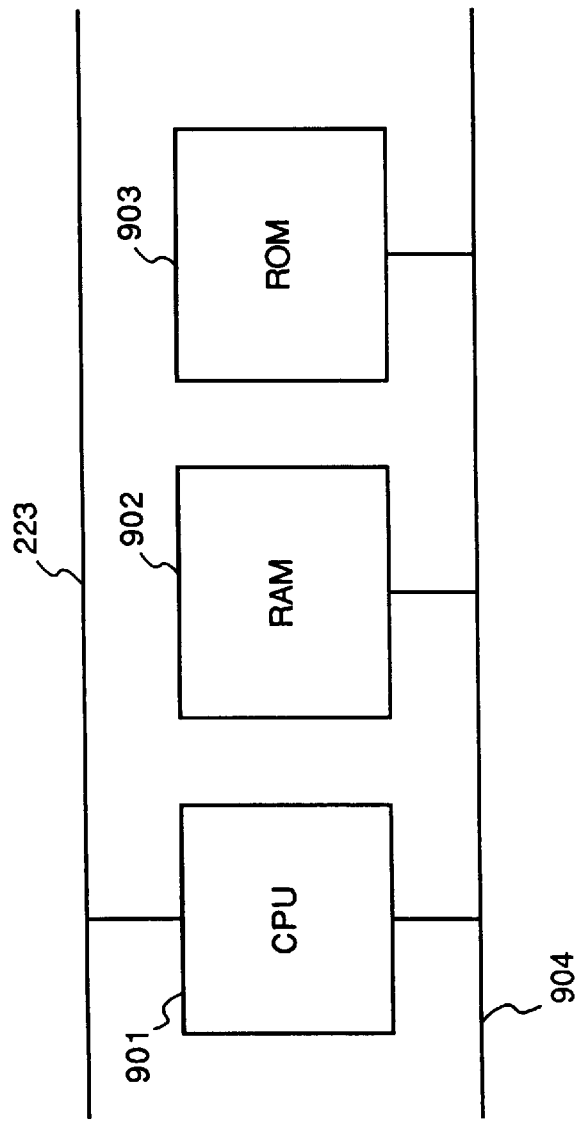

FIG.16A

| PRESCAN |
|---|
| XSIZE |
| YSIZE |
| XSTART |
| YSTART |
| XZOOM |
| YZOOM |
| FORMAT |
| EDGE/SMOOTH |
| COLOR TYPE |
| COLOR |
| LEVEL |
| CODE |
| BIT RATE |
| XSTEP |
| YSTEP |

FIG.16B

| SCAN |
|---|
| XSIZE |
| YSIZE |
| XSTART |
| YSTART |
| XZOOM |
| YZOOM |
| FORMAT |
| EDGE/SMOOTH |
| COLOR TYPE |
| COLOR |
| LEVEL |
| CODE |
| BIT RATE |
| XSTEP |
| YSTEP |
| OCR |

FIG.16C

| PRINT |
|---|
| XSIZE |
| YSIZE |
| XSTART |
| YSTART |
| XZOOM |
| YZOOM |
| FORMAT |
| EDGE/SMOOTH |
| COLOR TYPE |
| COLOR |
| LEVEL |
| CODE |
| UCR |
| BI-LEVEL |
| THRESHOLD |
| PAGE |

FIG.16D

| OK |
|---|

FIG.16E

| GAMMA |
|---|
| S/P |
| 1 |
| 2 |
| 3 |
| ⋮ |

FIG.16F

| MASKING |
|---|
| a11 |
| a12 |
| a13 |
| a14 |
| ⋮ |

FIG.16G

| STATUS |
|---|
| N |
| STATUS1 |
| STATUS2 |
| STATUS3 |
| ⋮ |

FIG.16H

| DATA |
|---|
| N |
| 1 |
| 2 |
| 3 |
| ⋮ |

FIG.16I

| ESC |
|---|
| |

FIG.17A  FIG.17B  FIG.17C  FIG.17D

| FIG.17A | FIG.17B | FIG.17C | FIG.17D |
|---|---|---|---|
| PRESCAN | SCAN | PRINT | OK |
| XSIZE | XSIZE | XSIZE | |
| YSIZE | YSIZE | YSIZE | |
| XSTART | XSTART | XSTART | |
| YSTART | YSTART | YSTART | |
| XZOOM | XZOOM | XZOOM | |
| YZOOM | YZOOM | YZOOM | |
| FORMAT | FORMAT | FORMAT | |
| EDGE/SMOOTH | EDGE/SMOOTH | EDGE/SMOOTH | |
| COLOR TYPE | COLOR TYPE | COLOR TYPE | |
| COLOR | COLOR | COLOR | |
| LEVEL | LEVEL | LEVEL | |
| | | UCR | |
| | | BI-LEVEL | |
| | | THRESHOLD | |
| | | PAGE | |

FIG.17E

| GAMMA |
|---|
| S/P |
| 1 |
| 2 |
| 3 |
| ⋮ |

FIG.17F

| MASKING |
|---|
| a11 |
| a12 |
| a13 |
| a14 |
| ⋮ |

FIG.17G

| STATUS |
|---|
| N |
| STATUS1 |
| STATUS2 |
| STATUS3 |
| ⋮ |

FIG.17H

| COPY |
|---|

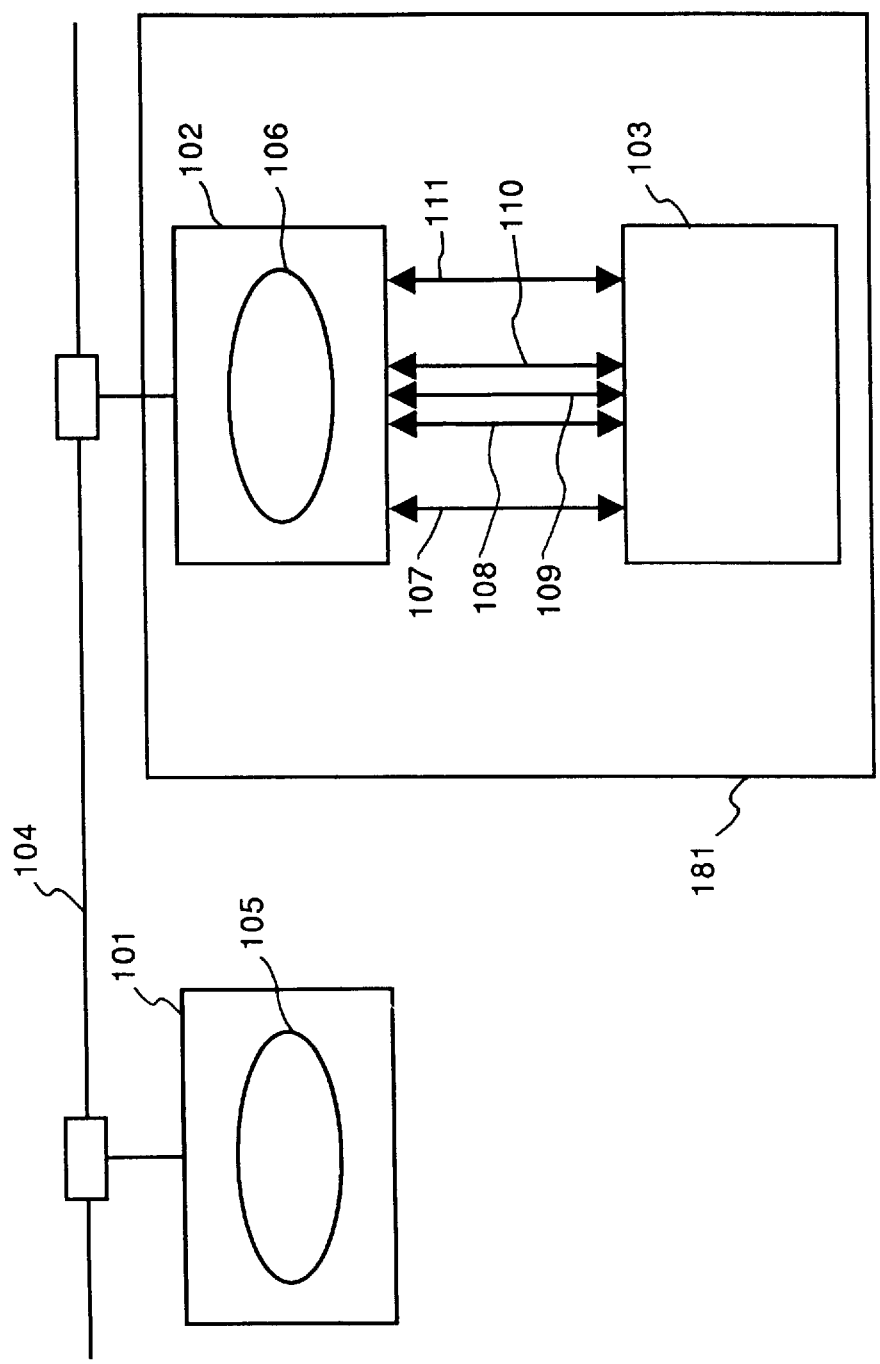

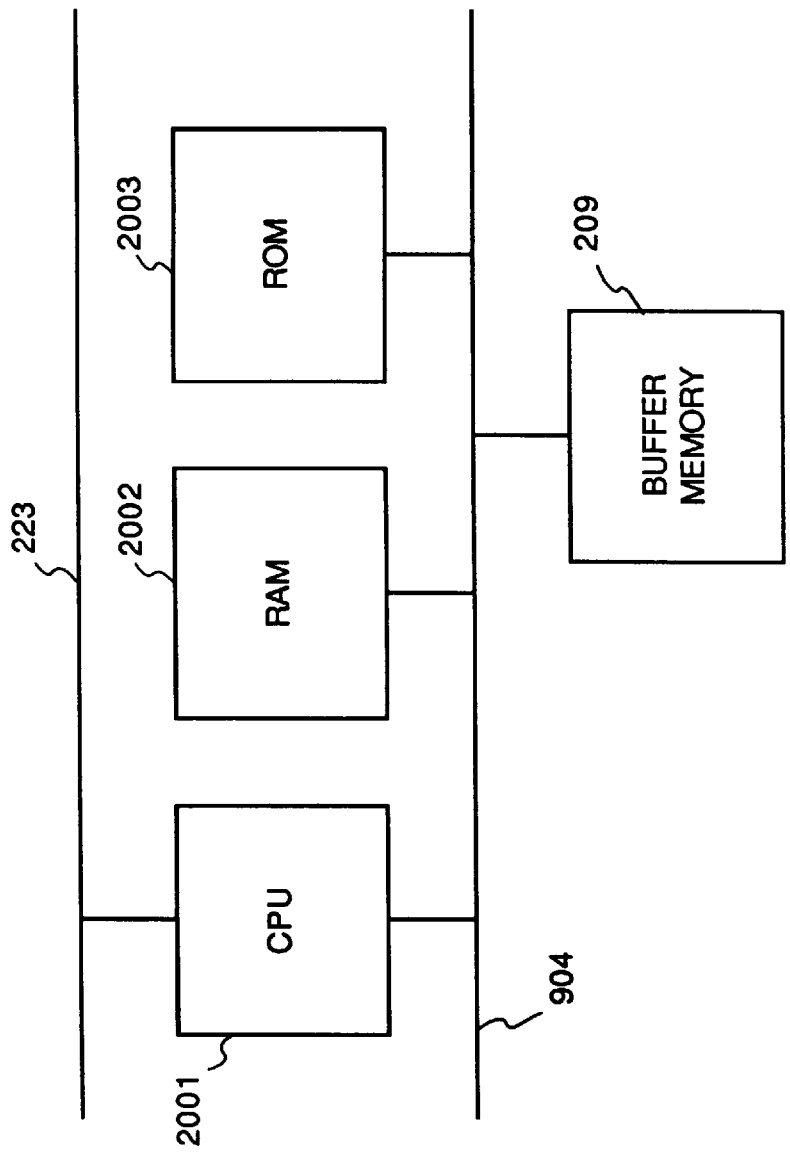

FIG.21A

| PRESCAN |
|---|
| XSIZE |
| YSIZE |
| XSTART |
| YSTART |
| XZOOM |
| YZOOM |
| FORMAT |
| EDGE/SMOOTH |
| COLOR TYPE |
| COLOR |
| LEVEL |
| CODE |
| BIT RATE |
| XSTEP |
| YSTEP |
| OCR |
| PDL |

FIG.21B

| SCAN |
|---|
| XSIZE |
| YSIZE |
| XSTART |
| YSTART |
| XZOOM |
| YZOOM |
| FORMAT |
| EDGE/SMOOTH |
| COLOR TYPE |
| COLOR |
| LEVEL |
| CODE |
| BIT RATE |
| XSTEP |
| YSTEP |
| OCR |
| PDL |

Ganon's one-stop color solution may

本日は 晴天なり

FIG. 25D
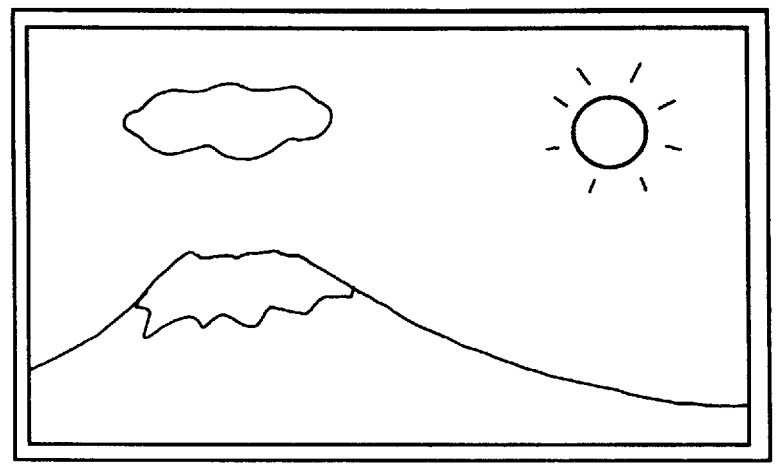
FIG. 25E
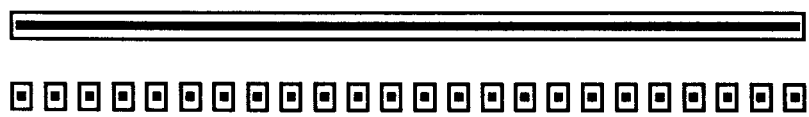
FIG. 25F
| abcdefg | ganon | printer | scanner |
|---------|---------|---------|---------|
| ghijklm | color | 20.2 | 1024 |
| lmn | 10.23 | kkk | abc |
| option | interface | produce | look |
| as | device | digital | hello |

FIG. 27

Ganon's one-stop color solution may be pricey, but does triple duty as copier, scanner, and printer.

What's bigger than a bread box and the most versatile color-output device you can buy?

CaPSL code

ESC [VERTICAL POSITION; HORIZONTAL POSITION f
........VERTICAL-HORIZONTAL ABSOLUTE
POSITION MOVEMENT COMMAND
ESC [CHARACTER SIZE SPACE C
........CHARACTER SIZE SELECTION COMMAND
ESC [CHARACTER STYLE m
........CHARACTER STYLE SELECTION COMMAND
ASCII code (or JIS code)

⇧

ESC [VERTICAL POSITION; HORIZONTAL POSITION f
........VERTICAL-HORIZONTAL ABSOLUTE
POSITION MOVEMENT COMMAND
ESC [LINE WIDTH; LINE TYPE; AUXILIARY POSITION
{........RULED-LINE STARTING COMMAND
ESC [VERTICAL POSITION; HORIZONTAL POSITION f
........VERTICAL-HORIZONTAL ABSOLUTE
POSITION MOVEMENT COMMAND
ESC [AUXILIARY POSITION; RECTANGLE OR DIAGONAL
LINE ; CORNER ROUNDING; SCREENING PATTER
NO; SCREENING PATTERN PROCESSING]
........RULED-LINE END COMMAND

⇧

ESC [VERTICAL POSITION; HORIZONTAL POSITION f
........VERTICAL-HORIZONTAL ABSOLUTE
POSITION MOVEMENT COMMAND
ESC [CHARACTER SIZE SPACE C
........CHARACTER SIZE SELECTION COMMAND
ESC [CHARACTER STYLE m
........CHARACTER STYLE SELECTION COMMAND
ASCII code (or JIS code)

⇧

PostScript

/Times-Roman findfont
........CHARACTER STYLE SELECTION
15 scalefont ........CHARACTER SIZE SELECTION
setfont
HORIZONTAL POSITION; VERTICAL POSITION; move to
........VERTICAL-HORIZONTAL ABSOLUTE
POSITION MOVEMENT COMMAND
ASCII code (or JIS code) show ........CHARACTER CODE
showpage newpath
HORIZONTAL POSITION; VERTICAL POSITION; move to
........VERTICAL-HORIZONTAL ABSOLUTE
POSITION MOVEMENT COMMAND
HORIZONTAL POSITION; VERTICAL POSITION; rline to
........END-POINT POSITION COMMAND
4 setlinewidth ........LINE-TYPE SELECTION COMMAND
stroke showpage /Times-Roman findfont
........CHARACTER STYLE SELECTION
15 scalefont ........CHARACTER SIZE SELECTION
setfont
HORIZONTAL POSITION; VERTICAL POSITION; move to
........VERTICAL-HORIZONTAL ABSOLUTE
POSITION MOVEMENT COMMAND
ASCII code (or JIS code) show ........CHARACTER CODE
showpage

FIG. 28

CaPSL code

ESC [VERTICAL POSITION; HORIZONTAL POSITION f
VERTICAL-HORIZONTAL ABSOLUTE
......POSITION MOVEMENT COMMAND

ESC [TOTAL BYTE NUMBER; WIDTH; RESOLUTION;
COMPRESSION FORMAT; HEIGHT;
/r RASTER IMAGE DATA......

PostScript

Scan_length Scan_lines Bits_per_sample [transform matrix]
{<RASTER IMAGE DATA>} image ......IMAGE COMMAND

IN CASE OF COMPRESSION DATA

Scan_length Scan_lines Bits_per_sample [transform matrix]
{<RASTER IMAGE DATA/NAME OF COMPRESSION
FORMAT Encode filter>} image

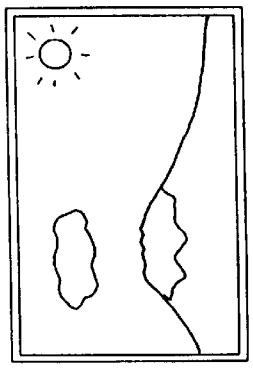

FIG. 29

CaPSL code

ESC [VERTICAL POSITION; HORIZONTAL POSITION f
VERTICAL-HORIZONTAL ABSOLUTE
......POSITION MOVEMENT COMMAND

ESC [TOTAL BYTE NUMBER; WIDTH; RESOLUTION;
COMPRESSION FORMAT; HEIGHT;
/r RASTER IMAGE DATA......

PostScript

Scan_length Scan_lines Bits_per_sample [transform matrix]
{<RASTER IMAGE DATA>} image ......IMAGE COMMAND

IN CASE OF COMPRESSION DATA

Scan_length Scan_lines Bits_per_sample [transform matrix]
{<RASTER IMAGE DATA/NAME OF COMPRESSION
FORMAT Encode filter>} image

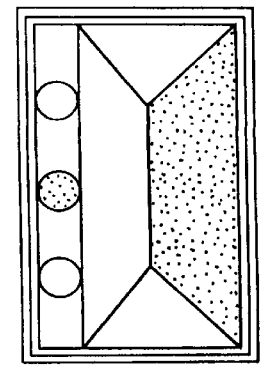

IMAGE PROCESSING APPARATUS METHOD AND SYSTEM FOR CONVERTING CHARACTER CODES OF CHARACTER IMAGES EXTRACTED FROM AN ORIGINAL IMAGE AND POSITIONS OF THE IMAGES FOR TRANSMISSION

This application is a continuation of application Ser. No. 08/043,474, filed Mar. 30, 1993, now abandoned.

BACKGROUND OF THE INVENTION

1. Field of the Invention

This invention relates to an image processing method and apparatus for controlling input/output of a scanner/printer or the like, which is a combination of an image scanner and a printer. The invention relates also to an image processing system constructed using this apparatus.

2. Description of the Related Art

Networking has made great progress in recent years and large-scale networks in which a LAN is deployed throughout the entirety of an intelligent building are now being set up. Furthermore, a nationwide network in which LAN's are connected directly by public switched telephone networks and sophisticated information networks such as ISDN's are being established.

These networks are making it possible for a user at one location to utilize a computer on another floor or in another building and enable a host computer in Osaka to be utilized from Tokyo. This in turn makes it possible for a printer server to be utilized over an extremely wide range rather than in the comparatively narrow range heretofore.

In order for a printer to be shared as a common resource of a conventional network of the abovementioned kind, the printer is connected to the network via a printer server. However, a scanner for reading in an image is not shared.

In a situation in which inputs are made utilizing a scanner, all of the input data is handled as bitmap data. Consequently, if a scanner were to be adopted as a common resource on a network, data that has been read would pass through the network and the amount of data involved would not only lower the efficiency of the network but would also necessitate a large storage area when the data is handled by a file server that is managing network files. Further, since the input data is handled as bitmap data, even a read original that is text cannot be edited as text.

Accordingly, a problem encountered in the prior art is that even if a scanner/printer having a scanner and a printer is connected to a network, the scanner cannot be utilized effectively as a shared resource of the network unless the image data read in by the scanner is subjected to appropriate processing.

SUMMARY OF THE INVENTION

An object of the present invention is to provide an image processing system in which various image processing services are used and a scanner/printer can be utilized effectively.

According to the present invention, the foregoing object is attained by providing an image processing apparatus comprising input means for entering image data, coding means for coding the image data, and communication means for sending and receiving data via a communication network.

The foregoing object is also attained by providing an image processing apparatus comprising input means for entering image data, classifying means for recognizing the type and position of the image data and classifying the image data according to type, coding means for converting the image data into code data in dependence upon the type of image, and converting means for converting code data and image data into page description language.

The invention further provides an image processing method comprising an input step of entering image data, a coding step of coding the image data, and a communication step of sending and receiving data via a communication network.

The invention further provides an image processing method comprising an input step of entering image data, a classifying step of recognizing the type and position of the image data and classifying the image data according to type, a coding step of converting the image data into code data in dependence upon the type of image, and a converting step of converting code data and image data into page description language.

The invention further provides an image processing system comprising an image input/output unit having means for reading in image data, means for printing out image data and exchange means for exchanging image data with external equipment, and a server unit having communication means for sending data to and receiving data from a communication network, means for exchanging image data with the exchange means, image generating means for generating image data based upon code data, and coding means for converting image data into code data.

The present invention makes it possible reduce the amount of image data by coding the data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the internal configuration of an image processing circuit on the scanner side;

FIG. 5 is a block diagram showing the internal configuration of an image processing circuit on the printer side;

FIG. 6 is a block diagram of a character recognition circuit;

FIG. 8 is a block diagram showing ADCT interpreter coding;

FIG. 9 is a block diagram showing a circuit for a PDL interpreter;

FIGS. 16A to 16I are diagrams showing server command packets;

FIGS. 17A to 17H are diagrams showing scanner command packets;

FIG. 18 is a diagram showing an alternate arrangement of a scanner/printer;

FIG. 20 is a block diagram of a PDL converting circuit in the second embodiment;

FIGS. 21A and 21B are diagrams showing server command packets in the second embodiment;

FIGS. 25A to 25F are diagrams showing examples in which areas are recognized in the second embodiment;

FIG. 27 is a diagram showing an example in which character data is converted into page description language in the second embodiment;

FIG. 28 is a diagram showing an example in which image data is converted into page description language in the second embodiment;

FIG. 29 is a diagram showing an example in which graphic data is converted into page description language in the second embodiment;

DESCRIPTION OF THE PREFERRED EMBODIMENTS

[First Embodiment]

A network in which a copier is connected as a scanner/printer will be described as a preferred embodiment of the invention.

Figure 1:
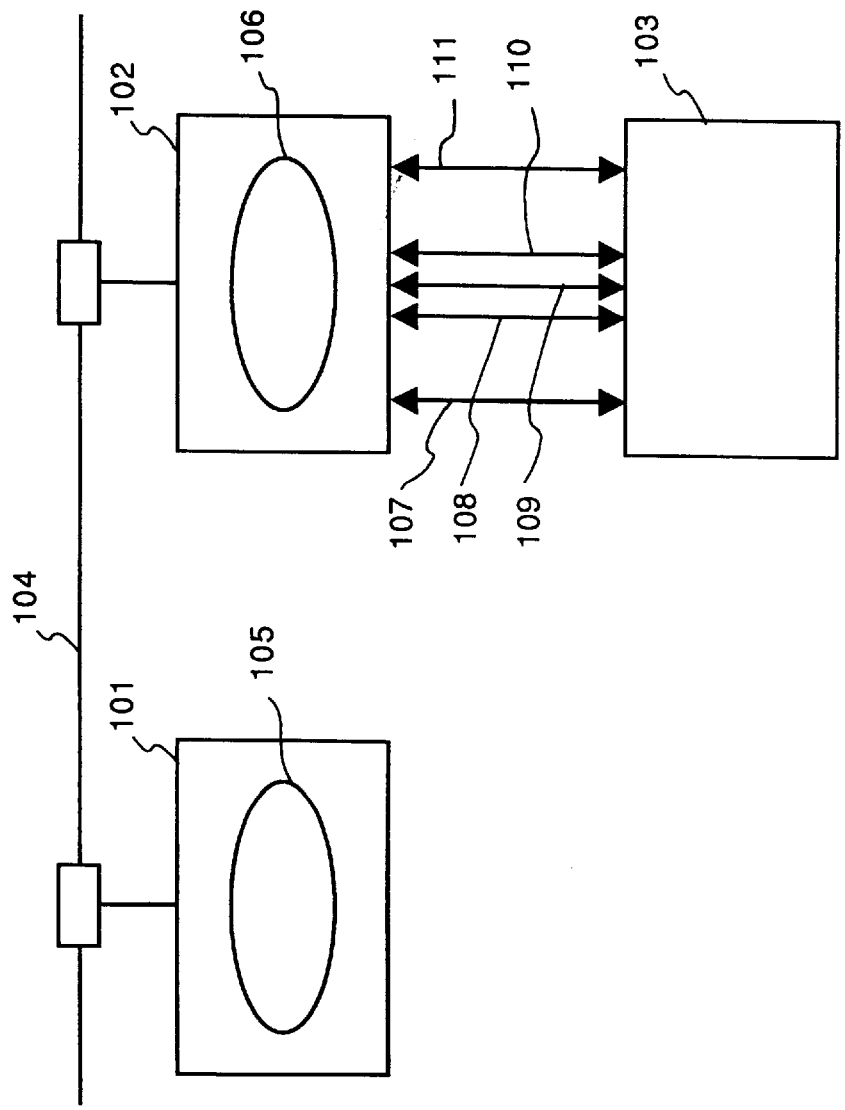
FIG. 1 is a diagram showing the configuration of a scanner/printer system embodying the present invention.
Figure 2:
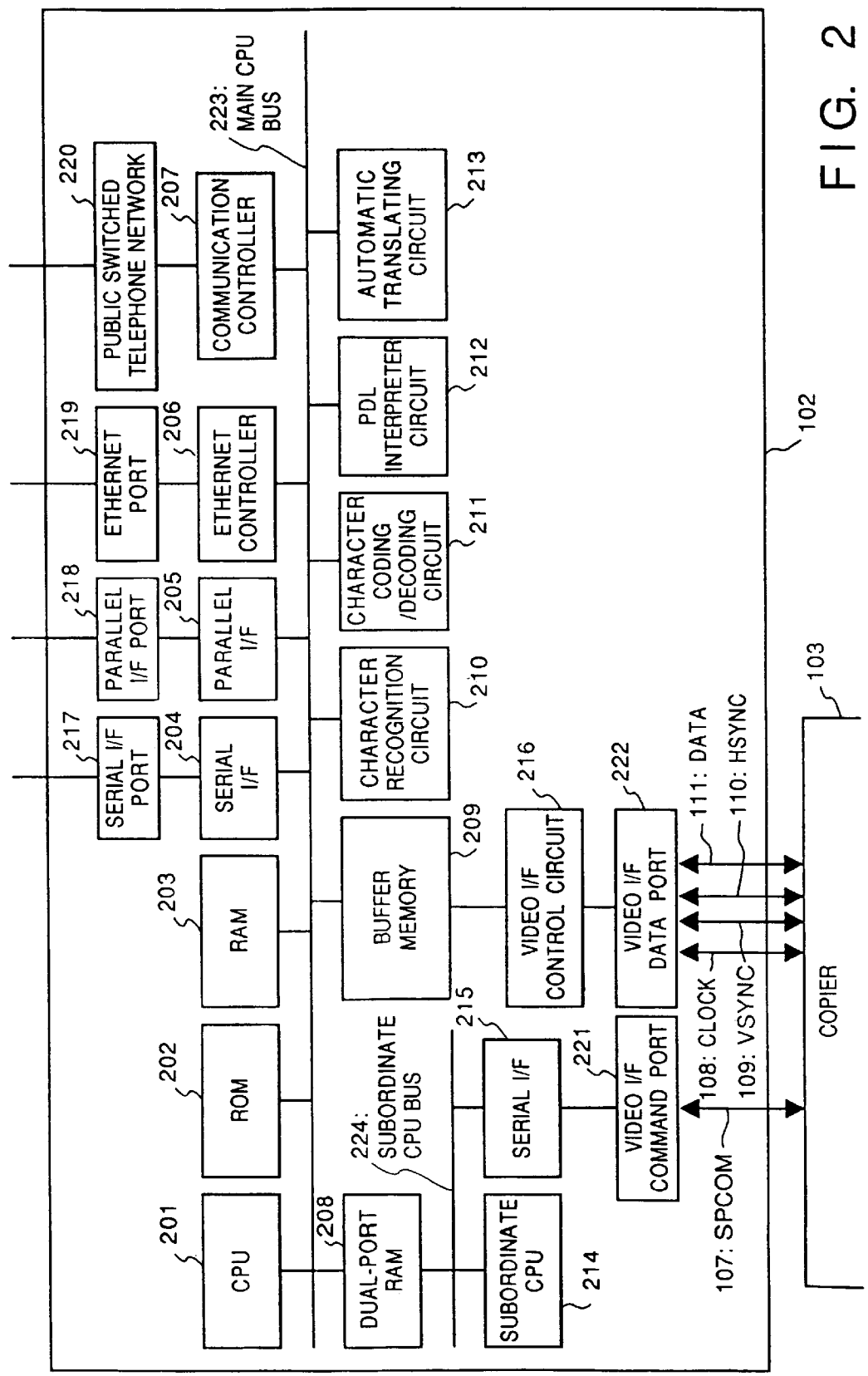
FIG. 2 is a diagram showing the internal configuration of a scanner/printer server.

FIGS. 1 and 2 illustrate part of a network according to a first embodiment of the invention;

FIG. 1 is a diagram showing the configuration of a network system according to this embodiment. The system includes a host computer 101 connected to a network (Ethernet) 104 and a copier 103 connected to the Ethernet 104 via a scanner/printer server 102. The host computer 101 executes a client process 105 that is for controlling the copier 103. The scanner/printer server 102 executes a server process 106 that controls the copier 103 based upon control of the client process 105. The client processor 105 carries out communication with the server process 106 via the Ethernet 104, reads an image from the scanner side of the copier 103 and prints out the image on the printer side of the copier 103. Copying within the copier 103 also is possible. It goes without saying that the copier is equipped with a scanner for reading images and a printer for printing out images. As will be described later, the scanner and printer can be utilized as independent input/output devices. Further, solely the internally provided functions of the copier can be utilized without employing the scanner and printer.

Control signals and data signals exchanged by the scanner/printer server 102 and copier 103 are SPCOM (a scanner/printer serial command signal) 107, CLOCK (a clock signal) 108, VSYNC (a vertical synchronizing signal) 109, HSYNC (a horizontal synchronizing signal) 110 and DATA (an image data signal) 111. These signals shall be referred to collectively as video I/F signals. The copier 103 can be used as a scanner solely for reading in image data, as a printer for printing out image data that has been sent to it, as a copying machine for outputting, by means of the printer, an image that has been read in by the scanner, as a server without making inputs or outputs, etc. The type of use is decided based upon a command given by the SPCOM signal. The video I/F signals are used in input/output of the image data and synchronizing signals.

<Configuration of scanner/printer server (FIG. 2)>

FIG. 2 is a diagram showing the internal configuration of the scanner/printer server 102. The various blocks will be described in accordance with FIG. 2. The scanner/printer server will be abbreviated to "server" where appropriate.

[Server-client communication]

When the scanner/printer server 102 is started, a CPU 201 within the server begins a program stored in a ROM 202 and executes the server process 106 using a RAM 203 as a temporary storage location. At this time the scanner/printer server 102 is connected to the Ethernet 104 via an Ethernet port 219 by means of an Ethernet controller 206 so that communication is possible with the client process 105 of the host computer 101.

[Server-copier communication]

The scanner/printer server 102 and the copier 103 perform an exchange of data by means of the video I/F signals such as the CLOCK 108 and DATA 111. The exchange of data based upon the video I/F signals is started and is temporarily stopped in completely synchronous fashion. Alternatively, a change in parameters on the side of the copier 103 is performed based upon the SPCOM (scanner/printer command) signal 107.

A subordinate CPU 214 is a special-purpose CPU that constantly monitors the SPCOM signal 107 between the copier 103 and the server 102. The CPU 214 is in constant communication with the copier 103, performs block management of the image data and accepts errors and the like.

A serial interface 215 allows serial communication of commands between the scanner/printer server 102 and the copier 103 via a video I/F command port 221.

Figure 11:
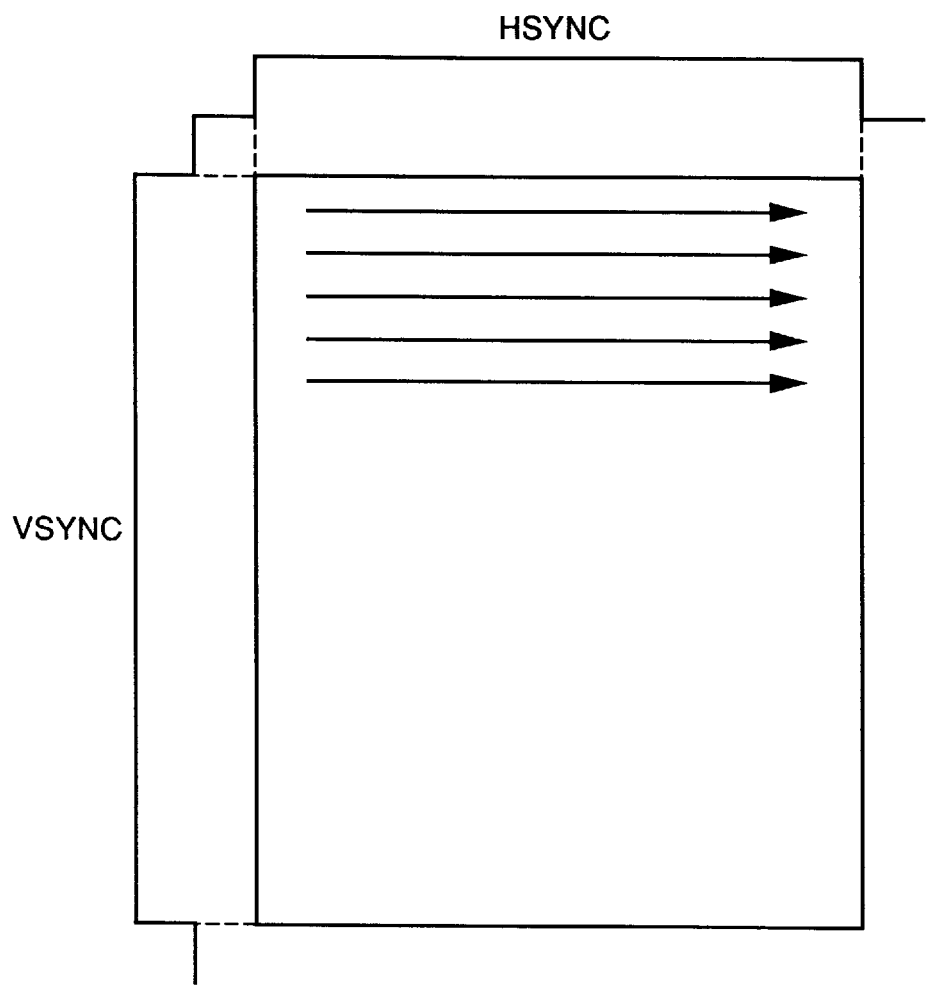
FIG. 11 is a diagram showing VSYNC, HSYNC and raster scanning.
Figure 12:
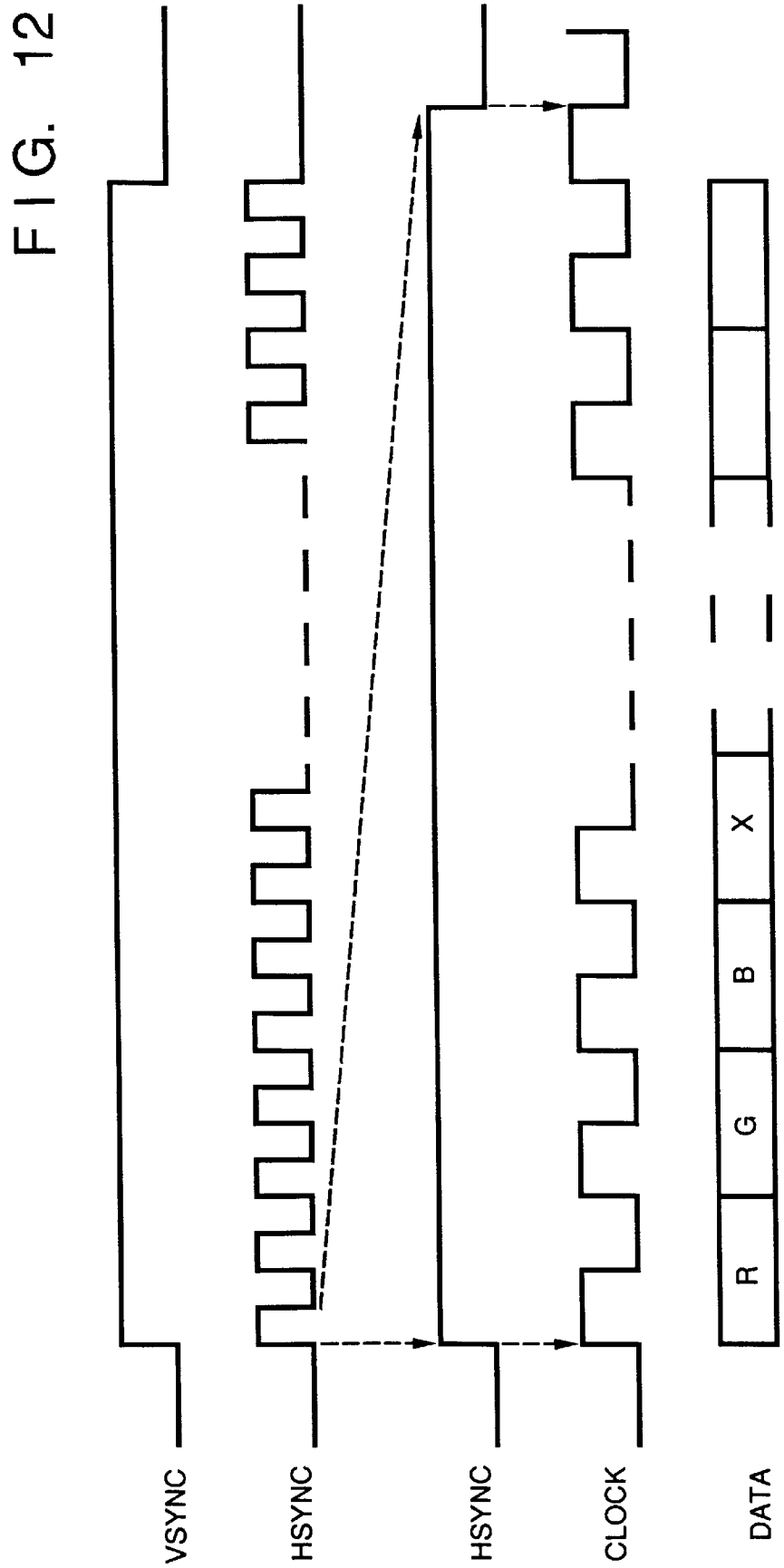
FIG. 12 is a timing chart showing video I/F timing.

A video I/F signal control circuit 216 is a circuit for controlling input/output of synchronizing signals, shown in FIGS. 11 and 12, input of image data outputted from the scanner side in synchronism with this control, and output of image data sent to the printer side. The input/output signals controlled here are the video I/F signals described earlier. Input/output is performed via a video I/F data port 222.

A dual-port RAM 208 performs communication between a main CPU 201 that manages the server process 106 and the subordinate CPU 214 that manages interfacing with the copier 103. This is carried out by interrupt control in cooperation with a memory. Whereas the subordinate CPU 214 is in constant communication with the copier 103, the main CPU 201 applies an interrupt to the subordinate CPU 214 only when necessary and delivers data through the dual-port RAM 208. Conversely, when the subordinate CPU 214 wishes to inform the main CPU 201 of end of scan and end of printing or of error information, the subordinate CPU 214 applies an interrupt to the main CPU 201 through the dual-port RAM 208 and performs an exchange of data.

The scanner/printer server 102 sends a pre-scan command, a scan command and the like to the scanner side of the copier 103 as commands exchanged by the scanner/printer server 102 and the copier 103. The scanner side of the copier 103 sends a copy command, status information, such as an information indicative of an operational abnormality, and the like.

Similarly, the scanner/printer server 102 sends a print command and the like to the printer side of the copier 103. The printer side of the copier 103 transmits status information such an information indicative of lack of paper, paper jamming, operational abnormalities, etc.

[Buffer memory]

The image data is accumulated in a buffer memory 209, which is capable of temporarily accumulating several lines of data. The buffer memory 209 is capable of being accessed from the CPU 201. Character recognition, coding and decoding of image data carried out upon reading the image data out of the buffer memory 209.

[Character recognition circuit]

A character recognition circuit 210 executes processing for converting character-image data into character-code data.

The conversion procedure performed by the circuit 210 is as follows:

(1) Character cutting

Character cutting is processing by which the CPU 201 detects breaks between pixels in the vertical and horizontal directions within the data stored in the buffer memory 209 and detects character segments. In actuality, the CPU 201 subjects half-tone image data, which have been read by the copier 103, to threshold processing to determine whether or not a pixel is present. For example, in the case of character-image data "It's fine today", the character image is cut into the character segments "I", "t", "'", "s", "f", "i", "n", "e", "t", "o", "d", "a", "y". If the case is in Japanese, "本日は晴天なり" is cut into "本", "日", "は", "晴", "天", "な", "り".

(2) Transfer of character segments

The CPU 201 reads the image data of the character segments out of the buffer memory 209 and sends this data to the character recognition circuit 210.

(3) Feature extraction of character segments

An extracted character segment is further subdivided into smaller blocks, and in each block it is determined by detection whether contiguous pixels extend from side to side, up and down or diagonally.

(4) Calculation of degree of similarity

Based upon the information indicative of feature extraction in each small block obtained in feature extraction (3), a character whose features having the highest degree of similarity is extracted from a dictionary. A detailed block diagram is a shown in FIG. 6, described below.

An image that has been read in subjected to character recognition by a procedure consisting of the four steps mentioned above.

[Image coding/decoding circuit]

A coding/decoding circuit 211 codes the data that has been read in from the scanner of the copier 103, and decodes coded image data sent from the Ethernet 104. An example of the coding method is ADCT (adaptive discrete cosine transformation). The ADCT coding method is a coding method for still color pictures. This will be described later with reference to the block diagram of FIG. 8.

[PDL interpreter]

A PDL interpreter 212 constitutes means for translating PDL (page description language), which describes a print command regarding the printer, developing the image in the buffer memory 209 in the form of a bitmap or bytemap and printing the image by the printer of the copier 103. A block diagram of the PDL interpreter 212 is shown in FIG. 9, described below.

[Automatic translating circuit]

The characters converted into character codes by the character recognition circuit 210 are collected clause by clause to form one sentence. An automatic translating circuit 213 accepts this sentence as data and translates it into a language designated by the host computer. For example, if the language read in from the scanner is Japanese, this is translated into English.

The translation procedure consists of the following steps:

(1) Morpheme analysis

One sentence is divided into words.

For example, "Watakushi wa kyo yujin no ie ni asobi ni iku (私は今日友人の家に遊びに行く), I will visit my friend today, in English" is divided into "Watakushi (私)", "wa (は)", "kyo (今日)", "yujin (友人)", "no (の)", "ie (家)", "ni (に)", "asobi (遊び)", "ni (に)", and "iku (行く)".

(2) Modifier analysis

Modifiers are detected among the words resulting from morpheme analysis.

For example, the word modifying "ie (家)" is detected in the manner "yujin (友人)" →"no (の)" →"ie (家)".

(3) Meaning analysis

A check of suitability is performed based upon the context of the sentence.

(4) Rephrase-rule analysis

When a translation is made from Japanese to English, word order is converted in accordance with the rules of the English language. In Japanese, the subject comes at the beginning of the sentence or near the beginning, and the predicate comes at the end of the sentence. In English, however, the rules of word order are different from those of the Japanese language. This conversion is made.

For example, when "Watakushi wa kyo yujin no ie ni asobi ni iku (私は今日友人の家に遊びに行く), I will visit my friend today, in English" is rearranged in English word order, we have "Watakushi wa (私は)" "asobi ni iku (遊びに行く)" "yujin no ie ni (友人の家に)" "kyo (今日)". If the rules are changed in the rule conversion, English can be translated into Japanese in a similar manner. A translation between any two languages also is possible in similar fashion.

(5) Translation

A Japanese-English conversion, English-Japanese conversion, etc., is performed based upon the rephrase-rule.

Any language can be translated into another through the procedure of five steps described above.

Though there are configurations in which the automatic translating circuit 213 is provided in the server 102 or in the host computer, the case illustrated here is one in which the circuit 213 is provided in the server 102.

[Hardware blocks]

In order to realize the functions in the various blocks described above, or in order to realize functions not particularly described in detail above, the server 102 has the following blocks:

CPU 201: Executes a server program stored in the ROM 202 to distribute image data, control the scanner/printer server 102 and manage the copier 103.

ROM 202: The server program is stored here in advance.

RAM 203: Used as the working memory of the CPU 201 and to temporarily store image data.

Serial I/F 204: Used for making connection to a terminal or serial printer via a serial I/F port 217.

Parallel I/F 205: Connected, via a parallel I/F port 218, to a parallel input/output scanner or printer constituted by a Centronix I/F, GPIB, SIS, etc., to enable input/output of image data via the parallel input/output port 218.

Communication controller 207: Connects data, which is the result of converting character-image data into character-code data by means of character recognition, to a digital public switched telephone network or ISDN via a public switched telephone network I/F 220 and controls transmission or reception. Though there is a configuration in which the communication controller 207 is provided within the host computer, the controller 207 is provided in the server 102 in the illustrated embodiment.

<Configuration of copier (FIGS. 3, 4, 5)>

Figure 3:
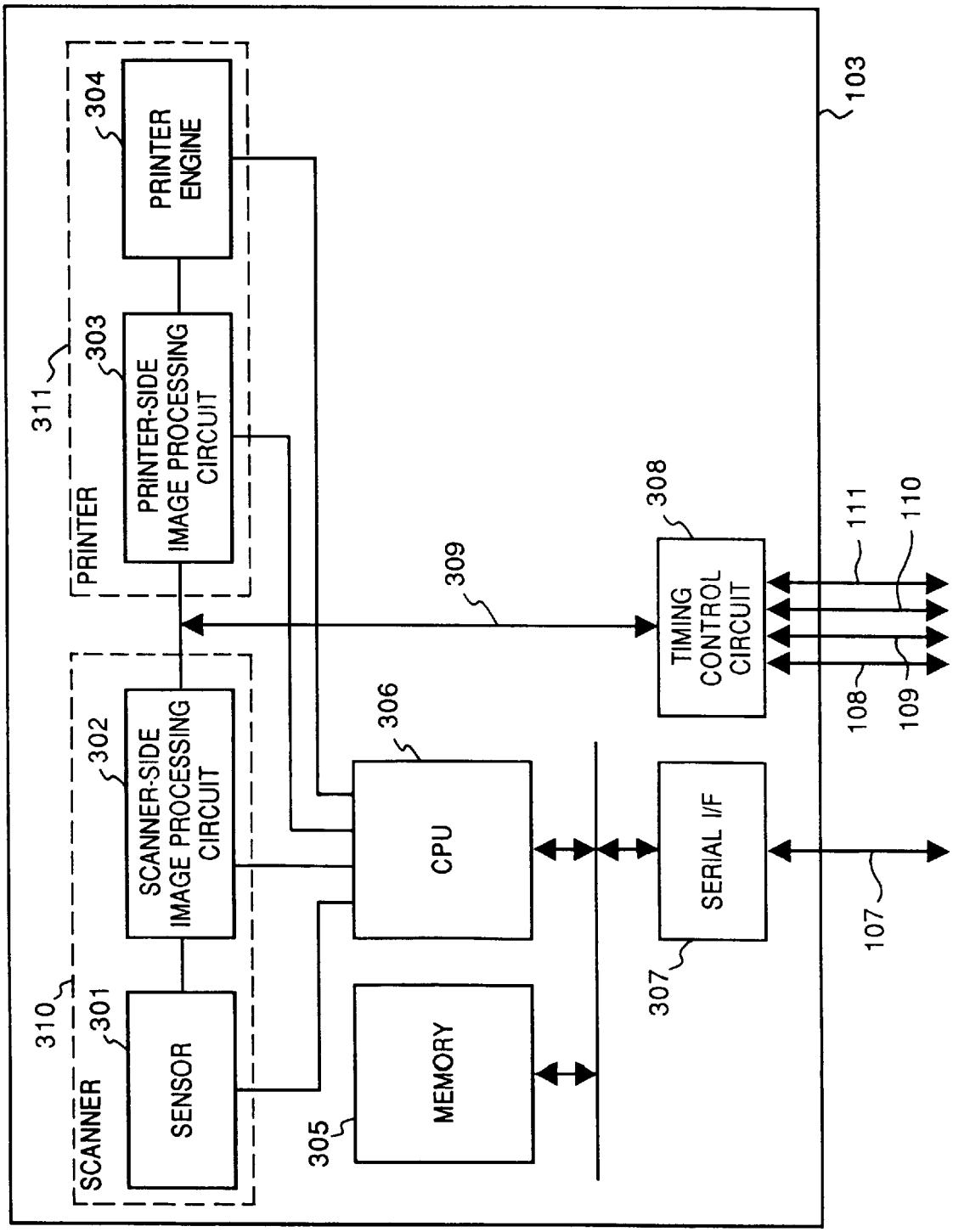
FIG. 3 is a diagram showing the configuration of a scanner/printer.

FIG. 3 is a block diagram illustrating the copier 103. The copier 103 includes a CPU 306 that executes a program, which has been stored in a memory 305, to control each block constituting the copier. In this arrangement, the operation of each component will be described for a case in which the scanner and the printer operate independently. In FIG. 3, a reading sensor 301 reads the image, and an image processing circuit 302 on the scanner side processes the image signal read by the sensor 301. An image processing circuit 303 on the printer side processes image data outputted by a printer engine 304. The printer engine 304 records the image data on a medium. A CPU 306 for controlling the scanner/printer controls overall copier. A main memory 305 stores the program executed by the CPU 306, as well as various data. The blocks constructing the copier are interconnected by an image data bus 309 within the scanner/printer. The sensor 301 and the image processing circuit 302 shall be referred collectively as a scanner 310, and the printer engine 304 and image processing circuit 303 shall be referred collectively as a printer 311. In a case where the scanner 310 or printer 311 is mentioned below, this will be taken to include resources common to both, such as a CPU 306 and a timing control circuit 308.

[Scanner operation]

Operation for a case in which an image is scanned will be described with reference to FIG. 3.

A serial interface 307 receives a scan command from the scanner/printer server 102 and transmits the command to the CPU 306. Next, the CPU 306 decides the image size to be read in, as well as the scanning starting position of the image, from the received scan command.

The CPU 306 controls a scanner drive circuit (not shown) within the scanner 310, and the image is read out one pixel column at a time, as shown in FIG. 11, by the sensor 301. The read image data is subjected to the necessary image processing by the image processing circuit 302 on the scanner side. Thereafter, at the timing shown in FIG. 12, the timing control circuit 308 outputs CLOCK (clock signal) 108, VSYNC (vertical synchronizing signal) 109 and HSYNC (horizontal synchronizing signal) 110 as well as image data obtained from the image data bus 309. The image data is outputted as DATA (image data signal) 111 synchronized to these signals. The timing chart of FIG. 12 is an example representing the reading in of one page of data.

The scanner/printer server 102 reads the image data in synchronism with the signals HSYNC 110, VSYNC 109 and CLOCK 108 that enter from the copier 103. The video I/F control circuit 216 in the scanner/printer server 102 receives the image data from the copier 103 and stores it in the buffer memory 209.

[Operation on printer side]

Operation for a case in which an image is printed will be described with reference to FIG. 3.

The serial interface 307 receives a print command from the scanner/printer server 102 and transmits it to the CPU 306. The scanner/printer CPU 306 then decides the image side and the printing starting position of the image from the print command.

The CPU 306 controls the printer engine 304 and records the image one pixel column at a time in the manner shown in FIG. 11. At this time the timing control circuit 308 receives the synchronizing signals CLOCK 108, VSYNC 109 and HSYNC 110, as well as the image data 111 synchronized to these signals, from the server 102 and the image processing circuit 303 on the printer side applies the necessary processing, after which the processing image data is outputted by the printer engine 304.

[Command operation]

The serial interface 307 communicates commands between the server 102 and copier 103 by means of serial transmission using SPCOM (scanner/printer serial command signal) 107. A pre-scan command, scan command and the like are transmitted as data from the scanner/printer server 102 for the sake of the scanning function of the copier 103. Further, the copier 103 transmits a copy command, status information indicative of an operational abnormality, etc.

Similarly, the scanner/printer 102 transmits a print command and the like for the sake of the printer function of the copier 103. The copier 103 transmits status information indicative of lack of paper, paper jamming, operational abnormalities, etc.

[Image processing on scanner side]

FIG. 4 is a block diagram showing the image processing circuit 302 on the scanner side. The image processing circuit 302 in FIG. 4 includes a shading correcting unit 401, a resolution converter 402, a scanner color converter 403, a scanner gamma converter 404 and a level converter 405. These units are connected to a bus (not shown). The parameters of these units are capable of being changed from the CPU 306.

The sensor 301 reads an RGB color image and inputs the resulting data to the image processor 302 on the scanner side.

The entered image data is subjected to a shading correction in the image processor 302 by means of the shading correcting unit 401, then the resolution converter 402 converts the reading resolution of the image. Resolution is capable of being selected from 400 dpi (dots per inch), 200 dpi, 100 dpi, etc. The resolution is designated by the CPU 306.

The scanner color converter 403 subjects the image to a color conversion. For example, the RGB color data is converted to a color space such as YCrCb or to Lab. Of course, if the data merely passes through, the data remains the RGB color data. If reading is monochromatic, a black-and-white conversion is performed from the correlation of the RGB data. The scanner color conversion is designated by the CPU 306. The scanner gamma converter 404 applies a gamma conversion, which is performed by an LUT (look-up table), to the image data, such as YCrCb, resulting from the color conversion. The designation of the LUT is carried out by the CPU 306. The level converter 405 converts the effective bit number of one pixel. For example, the lower order bits of the YCrCb data, each item of which is composed of eight bits, are discarded and a conversion of dynamic range is performed so that Y is made six bits and Cr, Cb are made four bits each. The designation of the level is made by the CPU 306.

[Image processing on printer side]

FIG. 5 is a block diagram showing the processing circuit 303 on the printer side. The image data that has entered the image processing circuit 303 is subjected to the processing described below.

A printer color converter 501 color-converts the image to RGB. For example, if the image has entered in a YCrCb color space, then the image is converted to RGB.

A printer gamma converter 502 subjects the input image to a gamma conversion. More specifically, the conversion performed is as follows:

$$R'=f(R)$$

$$G'=f(G)$$

$$B'=f(B)$$

This conversion is carried out by a LUT (look-up table). The setting of the LUT is performed by the CPU 306.

A masking converter 503 subjects the input image to a masking conversion. The masking conversion is a primary conversion expressed by $$(R''G''B'') = \begin{pmatrix} a_{11} & a_{12} & a_{13} \\ a_{21} & a_{22} & a_{23} \\ a_{31} & a_{32} & a_{33} \end{pmatrix} \begin{pmatrix} R' \\ G' \\ B' \end{pmatrix} \quad \text{(Eq. 1)}$$

or a secondary conversion expressed by $$(R''G''B'') = \begin{pmatrix} a_{11} & a_{12} & a_{13} & a_{14} & a_{15} & a_{16} & a_{17} & a_{18} & a_{19} & a_{20} \\ a_{21} & a_{22} & a_{23} & a_{24} & a_{25} & a_{26} & a_{27} & a_{28} & a_{29} & a_{30} \\ a_{31} & a_{32} & a_{33} & a_{34} & a_{35} & a_{36} & a_{37} & a_{38} & a_{39} & a_{40} \end{pmatrix} \begin{pmatrix} R' \\ G' \\ B' \\ R'*R' \\ G'*G' \\ B'*B' \\ R'*G' \\ G'*B' \\ B'*R' \\ 1 \end{pmatrix} \quad \text{(Eq. 2)}$$

This conversion is performing using a LUT or gate array. The parameters of the LUT or gate array are set by the CPU 306.

A unit 504 for black generation and undercolor removal converts the RGB data into CMK, generates black (Bk) from this data and performs undercolor removal. This is indicated as follows:

$$C=255-R''$$

$$M=255-G''$$

$$Y=255-B''$$

$$Bk=\alpha[\min(C,Y,M)] \quad \text{(Eq. 3)}$$

$$C'=C-Bk$$

$$M'=M-Bk$$

$$Y'=Y-Bk$$

This conversion is performed by a LUT or gate array. The parameters of the LUT or gate array are set by the CPU 306.

A binarizer 505 binarizes the image if the printer engine 304 is a binary printer. The binarizing method can be changed over to any of three types, namely a simple binarizing method, a dither method or an error-diffusion method. If the printer engine 304 is a multivalued printer, the binarizer 505 is not required. The binarizing processing is performed by a gate array. The setting of the binarizing method, the threshold value for binarization, etc., is performed by the CPU 306.

The foregoing is the construction of the copier 103. The elements constituting the scanner/printer server 102 will now be described in greater detail.

<Description of character recognition (FIGS. 6, 7A and 7B)>

Figure 7A:
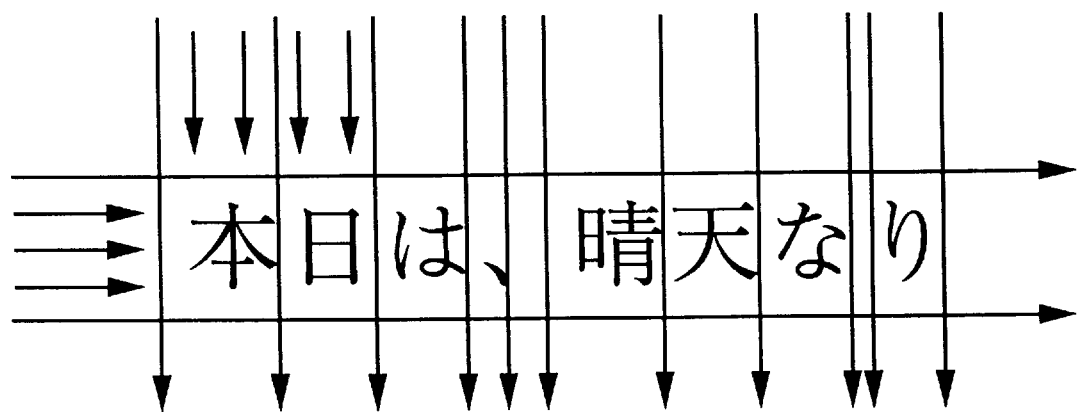
FIG. 7A is a diagram for describing character segmentation and FIG. 7B is a diagram for describing feature extraction.
Figure 7B:
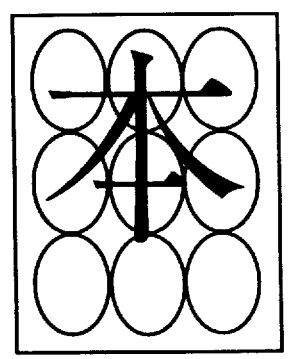

FIG. 6 is a block diagram showing the internal construction of the character recognition circuit, and FIG. 7A is a diagram for describing character segmentation which includes Japanese KANJI and KANA characters and the sentence means "it's fine today" in English. FIG. 7B is a diagram for describing feature extraction and the word means "book" in English. As shown in FIG. 6, the character recognition circuit includes a DSP (digital signal processor) 601 for control of character recognition, a dual-port RAM 602, a feature extracting circuit 603, an identification circuit (dictionary) 604 and a local bus (for character recognition) 605.

The procedure of character recognition is as described above in the section regarding the character recognition circuit. This will now be described in accordance with FIGS. 6, 7A and 7B.

As shown in FIG. 7A, character segmentation involves processing for detecting, horizontally and vertically, the spacing between characters in the character image data that has been stored in the buffer memory 209, and segmenting the character blocks. A segmented character block is written in the dual-port RAM 602 from the CPU 201. The DSP 601 reads out the image data of the character block and inputs the data to the feature extracting circuit 603. As shown in FIG. 7B, the feature extracting circuit 603 subdivides the character image data into smaller blocks, detects the directions of lines in the blocks and extracts the features of the characters. FIG. 7B illustrates nine blocks enclosed by ovals. In actuality, however, subdivision is made into even smaller blocks, e.g., 64 blocks or more.

The results of feature extraction are sent to the identification circuit 604, where characters similar to the extracted features are selected. At this time several similar characters are selected and all of the character codes are written in the dual-port RAM 602. Based upon the context of the characters, the main CPU 201 detects the relevant characters from the characters that are candidates. This ends the character recognition procedure.

[Image coding/decoding (FIG. 8)]

FIG. 8 is a diagram illustrating functional blocks within the image coding/decoding circuit 211. This circuitry performs ADCT coding and compresses the RGB multivalued image (each color consisting of eight bits).

In the ADCT method, the R, G, B signals enter from an R (red) component input unit 801, a G (green) component input unit 802 and a B (blue) component input unit 803, whereupon these components are converted into Y, Cr, Cb (luminance and chrominance components) by a color converter 804. The converted signals are applied to a Y (luminance) component input unit 805, a Cr (chrominance) component input unit 806 and a Cb (chrominance) component input unit 807, where the respective components are extracted. The component signals from the units 805, 806, 807 enter an 8×8 DCT (discrete cosine transformation) processor 808. The DCT processor 808 subjects each signal to a two-dimensional discrete cosine transformation every 8×8 block.

The signal resulting from DCT is separated into AC and DC components after the DCT coefficients are linearly quantized by a linear quantizer 809. The AC components are subjected to zigzag scanning by a zigzag-scan/image-data input unit 812, after which the resulting signal is subjected to two-dimensional Huffman coding by a two-dimensional Huffman coder 813. The DC components undergo a one-dimensional prediction in a one-dimensional predicting unit 810, after which the output of the predicting unit 810 is Huffman-coded by a Huffman coder 811. The two code quantities are multiplexed by a multiplexer 814 to obtain a compressed image.

Data can be decompressed by subjecting it to processing which is the result of that executed by the ADCT coding block diagram of FIG. 8, namely expanding the data starting from the side of the multiplexer 814.

The color converter 804 converts the RGB data into YCrCb. If a function of the kind implemented by the scanner color converter 403 shown in FIG. 4 is provided in the scanner, the color converter 804 will be unnecessary. Though FIG. 8 is a method of coding/decoding multivalued color image data, other methods are conceivable. For example, MH, HR, MMR or LZW (Lempel-Ziv & Welch) methods used in facsimile communication can be employed.

<PDL interpreter (FIG. 9)>

FIG. 9 is a block diagram of circuitry for realizing a PDL interpreter.

PDL (page description language) is sent from the host computer 101 to the scanner/printer server 102 through the network 104. In the server 102, PDL temporarily accumulated in the RAM 203 through the Ethernet controller 206 is read out and interpreted by the PDL interpreter 212 and developed as an image. A CPU 901 in the PDL interpreter is the circuit for this purpose. A RAM 902 is a working memory used as this time, and a ROM 903 stores a program executed by the CPU 901.

The result of developing one bit by the CPU 901 is written in the buffer memory 209 through the main CPU bus 223. This is subsequently sent to the printer of the copier 103 as image data and is printed out by the copier 103.

<Description of automatic translation (FIG. 10)>

Figure 10:
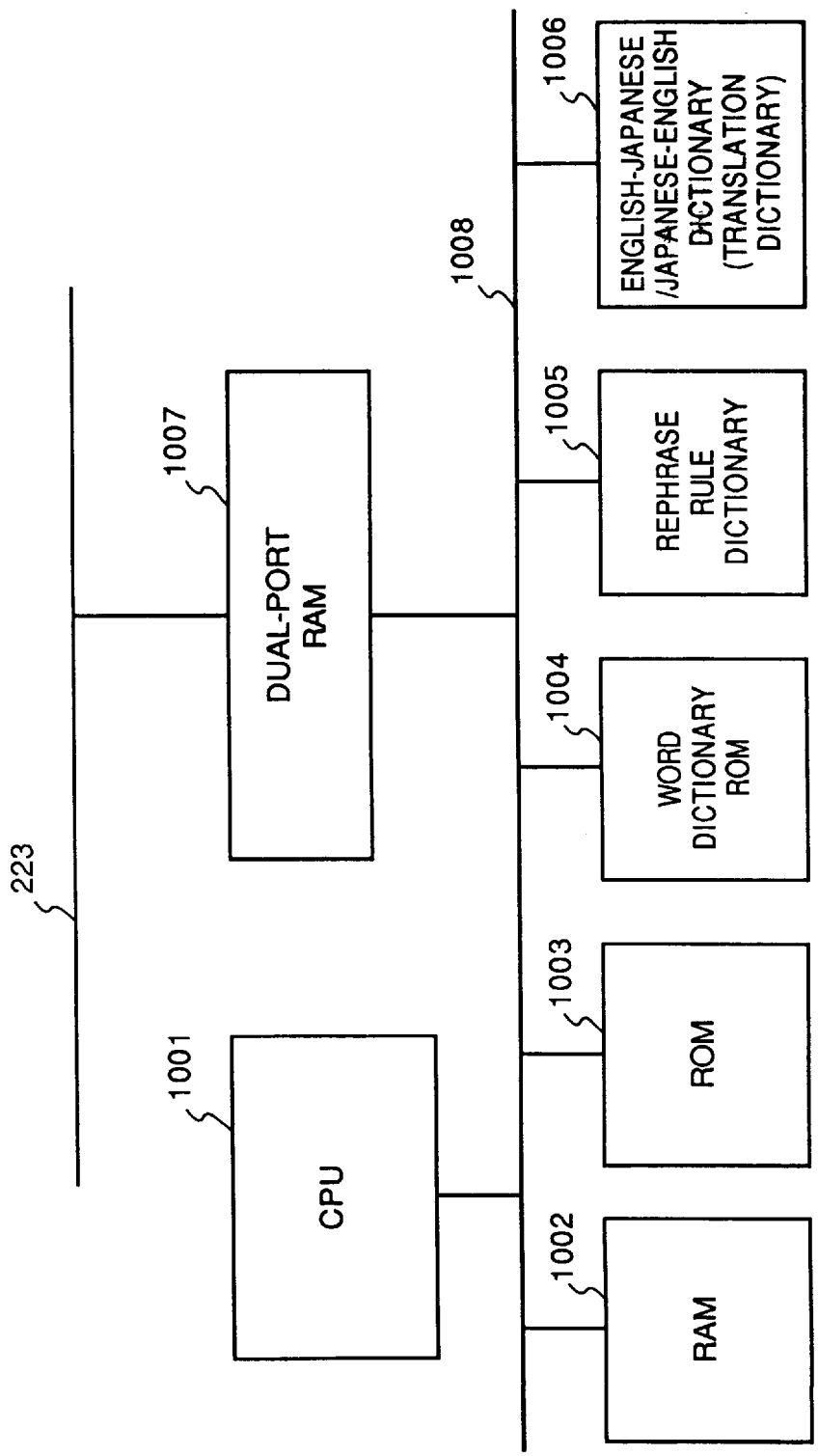
FIG. 10 is a block diagram showing a translating circuit.

FIG. 10 is a block diagram of circuitry for realizing the automatic translating circuit 213 that performs Japanese-English/English-Japanese translation.

Characters that have been put into the form of character codes are collected together clause by clause and written in a dual-port RAM 1007 connected to the main CPU bus 223 and to a local bus 1008 so as to be accessible from both buses. A CPU 1001 on the side of the translating circuit 213 reads out a clause and subjects it to morpheme analysis. The words of each phrase are analyzed based upon words registered in a word-dictionary ROM 1004. Next, after modifier analysis is performed, meaning analysis is carried out. At this time also analysis is performed based upon the dictionary in the ROM 1004. The reordering of the words in a sentence is carried out by the rephrase-rule analysis based upon a rephrase-rule dictionary 1005. After word order of the sentence has been changed, a translation from Japanese to English or from English to Japanese is carried out based upon an English-Japanese/Japanese-English dictionary 1006, the translation is written in the dual-port RAM and is read out to the main CPU 201. In order for the foregoing processing to be implemented, a program executed by the CPU 1001 is stored in a ROM 1003. A RAM 1002 is a memory used at this time.

<Operation of scanner/printer>

The operation of the scanner/printer server for character recognition of this embodiment constructed as set forth above will now be described. In this description, the arrows indicate a sequential operation.

[Scanner]

(1) Pre-scanning

→ Read-in by the client process 105 on the side of the host computer is designated.

→ The designation is received by the server process 106 on the side of the scanner/printer server.

→ An image is read in from the scanner 310 of the copier 103.

→ The server 102 buffers the image data, which has been read in, in the buffer memory 209.

→ Data that has been subjected to thinning-out processing or compression processing is transferred to the host computer 101 through the network 104.

→ The client process 105 on the side of the host computer causes a monitor (not shown) to display data obtained by decompressing the thinned-out data or compressed image data.

The image read in by the copier 103 through the foregoing operation is received by the host computer 101.

(2) Character-recognition scanning

→ The image data obtained by the pre-scanning (1) undergoes character-area designation and reading in of the image from the client process 105 is designated again.

→ Reading in is designated by the server process 106 on the side of the scanner/printer server.

→ The designated area is read in by the scanner 310 of the copier 103.

→ The server 102 buffers the read image data in the buffer memory 209.

→ The character areas of the buffered image data are subjected to character segmentation.

→ Character coding is performed by the character recognition circuit 210.

→ The character codes are accumulated in the RAM 203.

→ The character codes are transferred to the host computer 101 through the network 104.

By performing the foregoing operation, an image is read in by the copier 103, characters are recognized and the results are received by the host 101.

The processing described below can be added to the character-recognition scanning operation set forth above.

● When characters are segmented from the buffered image data, character color or background color is detected, characters of a designated color or of a color other than that designated are recognized, the characters are coded and the codes are transferred to the host computer.

● By segmenting a character from the buffered character image, character position is detected, this is added on to the character code and the result is transferred to the host computer 101.

● By segmenting a character from the buffered character image, character position is detected, the character code and position information obtained are converted into the form of page description language and the result is transferred to the host computer 101.

● The type of font and the size of a character code resulting from character recognition are detected, after which the type of font and size are changed by a designation made in advance from the host computer 101.

● The character image read in is held in the server 102 in the form of page description language, this is combined with image data (a natural scene or the like) obtained by scanning the image data again and the result is transferred to the host computer 101.

● The character image read in is held in the server 102 in the form of page description language, this is combined with image data, which is obtained by scanning the image data again, after this image data is compressed, and the result is transferred to the host computer 101.

The foregoing operations also can be carried out. The printer of the copier 103 performs the following operations:

[Printer]
(3) Printing
→ Print data is transferred to the server 102 from the client process 105 on the side of the host computer.
→ The print data is received by the server process 106 on the side of the scanner/printer server.
→ If the print data is in the form of page description language, bit development is performed by the PDL interpreter 212.

If the print data is compressed image data, bit development is performed by the coding/decoding circuit 211.

If the print data is character-code data, character bit development is performed.

If the print data is bit data, this is not subjected to any processing.

→ The bit data is accumulated in the buffer memory 209 of the server 102.
→ The data in the buffer memory 209 is sent to the copier 103 and the data is printed by the printer 311.

In a case where the client uses the apparatus as a character recognition server by employing the character recognition function within the scanner/printer server 102, the following operations are performed:

(4) Character recognition server
→ The character image data is transferred to the server 102 from the client process 105 on the side of the host computer.
→ The character image data is received by the server process 106 on the side of the scanner/printer server.
→ If the character image data is compressed image data, bit development is carried out by the coding/decoding circuit 211. If the character image data is bit data, the data is not subjected to any processing.
→ The character image data is stored temporarily in the buffer memory 209.
→ The buffered character image data is subjected to character segmentation.
→ Coding of the character image data is performed by the character recognition circuit 210.
→ The character code is accumulated in the RAM 203.
→ The character code is transferred to the host computer 101 again through the network 104.

By virtue of the foregoing operations, the apparatus functions as a character recognition server for processing the data provided by the host computer 101 and returning the processed data to the host.

The following procedure can be added as an operation of the character recognition server:

● When characters are segmented from the buffered image data, character color or background color is detected, characters of a designated color or of a color other than that designated are recognized, the characters are coded and the codes are transferred to the host computer.

● By cutting a character from the buffered character image, character position is detected, this is added on to the character code and the result is transferred to the host computer 101.

● By cutting a character from the buffered character image, character position is detected, the character code and position information obtained are converted into the form of page description language and the result is transferred to the host computer 101.

In a case where the copier 103 is used as character recognition copy by employing the character recognition function within the scanner/printer server 102, the following operations are performed:

(5) Character recognition copy
→ The character original is read from the scanner 310.
→ The server 102 buffers the image data in the buffer memory 209.
→ Coding of the buffered character image is carried out by the character recognition circuit 210. The type of font and size are identified at the same time.
→ The character code, font category and size are accumulated in the RAM 203.
→ The font and size of the character code are changed to those designated by the host computer 101 in advance.
→ Bit development of the character-code data is carried out.
→ The bit data is accumulated in the buffer memory 209 of the server 102.
→ The data in the buffer memory 209 is sent to the printer 311 of the copier 103 and is printed out.

The following operations are performed when the apparatus is used as a character-recognition/automatic-translation server for automatically translating character strings and sentences that have been put into the form of character codes by character recognition:

(6) Character-recognition/automatic-translation server
→ The image data obtained by the pre-scanning (1) undergoes character-area designation and read-in of the image to the server 102 from the client process 105 is designated again.
→ The designation is received by the server process 106 on the side of the scanner/printer server.
→ The designated area is read in by the scanner 310 of the copier 103.
→ The server 102 buffers the image data in the buffer memory 209.
→ The buffered character image data is subjected to character segmentation.
→ Character coding is performed by the character recognition circuit 210.
→ The character codes are accumulated in the RAM 203.
→ The character codes are transferred to the host computer 101 through the network 104.
→ The client processor 105 receives the character codes and performs automatic translation based upon the character strings and sentences before and after.

A translation can be performed between any two languages. For example, English can be translated into Japanese or Japanese can be translated into English.

The foregoing is an example in which automatic translation is performed by the host computer. However, there is also a case in which translation is performed utilizing the translation function that employs the automatic translating circuit 213, after which the translated character codes are sent to the host computer 101 through the network 104.

Described next will be operation in a case where the apparatus is used as a character recognition/teletext communication server for sending or receiving a document, which has been subjected to character recognition and converted into character codes, using a public switched telephone network.

(7) Character-recognition/teletext communication server

● Transmission

→ The image data obtained by the pre-scanning (1) undergoes character-area designation and read-in of the image to the server 102 from the client process 105 is designated again.

→ The designation is received by the server process 106 on the side of the scanner/printer server.

→ The designated area is read in by the scanner 310 of the copier 103.

→ The server 102 buffers the image data in the buffer memory 209.

→ The buffered character image data is subjected to character segmentation.

→ Coding of the character image data is performed by the character recognition circuit 210.

→ The character codes are accumulated in the RAM 203.

→ The character codes are transferred to the host computer 101 through the network 104.

→ The client processor 105 receives the character codes and transfers the codes to the other party through a public switched telephone network, such as a digital public switched telephone network or ISDN, that is connected to the host computer 101.

● Reception

→ Data transferred from the sender is received by the host computer 101, and the host computer 101 transfers this data to the scanner/printer server 102 through the network 104.

→ The data is received by the server process 106 on the side of the scanner/printer server.

→ If the received data is in the form of page description language, bit development is performed by the PDL interpreter 212.

If the data is compressed image data, bit development is performed by the image coding/decoding circuit 211.

If the print data is character-code data, character bit development is performed.

If the print data is bit data, this is not subjected to any processing.

→ The bit data is accumulated in the buffer memory 209 of the server 102.

→ The data in the buffer memory 209 is sent to the copier 103 and the data is printed by the printer 311.

The sending/receiving operation described above illustrates an example in which the function of the public switched telephone network is performed by the host computer. However, there are also cases in which a connection is made to the public switched telephone network using the communication controller 207, which performs a public switched telephone network connecting function, within the server 102, and character codes that have been converted from the character image data are sent to the other party via the public switched telephone network. Conversely, it is possible for the server 102 to receive data, which has been transferred from a public switched telephone network by the communication controller 207, and print out this data from the printer 311 of the copier 103.

<Description of image input/output procedure>

Image input/output of the scanner/printer server 102 of this embodiment will be described with reference to a zigzag chart while referring also to messages exchanged.

In a case where the image is read in from the copier 103, it is necessary to designate various parameters. For example, it is necessary to designate the size of the image, the position of the image, resolution, format (dot sequential scanning, line sequential scanning, field sequential scanning), edge emphasis, color space (RGB, YCrCb), color [which color to send (such as G only) is designated], level (number of tones of a color), coding method (ADCT, no coding, etc.), bit rate (bit rate at time of coding), thinnirig-out ratio at the time of pre-scanning, the file into which data is to be read, character recognition setting (whether or not to perform recognition, color designation and conversion to page description language, etc.).

Accordingly, the client processor 105 instructs the user, via a user interface such as a display, to designate these parameters. The user responds by designating the parameters and instructing the host computer 101 to execute pre-scanning. When this is done, the client process 105 communicates with the server process 106 in accordance with the sequence shown in FIG. 13.

Figure 13:
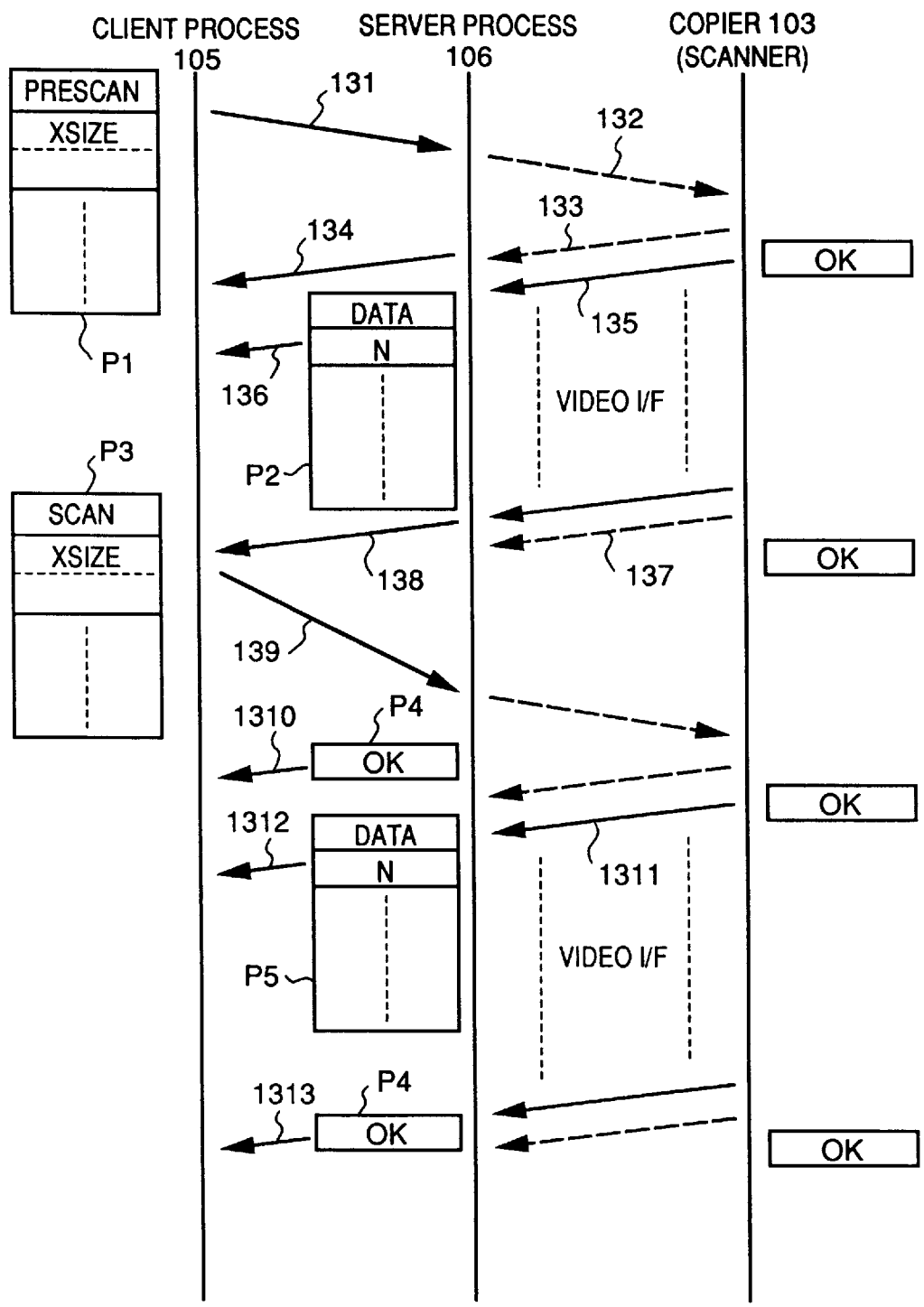
FIG. 13 is diagram showing a transition in scanner status.

Before FIG. 13 is described, the commands exchanged between processes and commands to the copier will be discussed with reference to FIGS. 16A to 16I and 17A to 17H.

<Packet configuration (FIGS. 16A to 16I and 17A to 17H)>

The configuration of packets exchanged by the host computer 101 and scanner/printer server 102 will be described with reference to these drawings. It should be noted that the description focuses on what appears in a zigzag chart described below.

FIG. 16A to 16I are diagrams showing packet configuration. Each field constituting the packet will be described.

FIG. 16A shows a PRESCAN packet, FIG. 16B a SCAN packet and FIG. 16C a PRINT packet. The first byte of each packet is a tag representing what the packet is. For example, if the packet is PRESCAN, pre-scanning is indicated by "1". If the packet is SCAN, scanning is indicated by "2".

XSIZE indicates the size, in the X direction, of an image comprising two bytes.

YSIZE indicates the size, in the Y direction, of an image comprising two bytes.

XSTART indicates scanning and printing starting position, in the X direction, of an image comprising two bytes.

YSTART indicates scanning and printing starting position, in the Y direction, of an image comprising two bytes.

XZOOM indicates scanning and printing resolution, in the X direction, of an image comprising one byte.

YZOOM indicates scanning and printing resolution, in the Y direction, of an image comprising one byte.

FORMAT indicates the image scanning method, in which "1" designates dot sequential scanning, "2" line sequential scanning and "31" field sequential scanning.

EDGE/SMOOTH indicates the degree of edge emphasis and smoothing, in which 16~1 designates edge emphasis and −1~−16 designates smoothing.

COLORTYPE indicates the color space of an image, in which "1" is designated for RGB, "2" for GMY, "3" for CMYK, "4" for YCeCb, "5" Lab and "6" for XYZ. In case of RGB, a first color shall refer to R, a second color to G and third color to B. In case of YCrCb, a first color shall refer to Y, a second color to Cr and a third color to Cb.

COLOR indicates which color of the image colors is to be transmitted. The particular color is assigned by bit. For example, if a color is the first color, the 0th bit is made "1"; if a color is the second color, the 1s7 bit is made "1"; if a color is the third color, the 2nd bit is made "1"; if a color is the fourth color, the 3rd bit is made "1".

By way of example, if COLORTYPE is RGB and all colors of RGB are sent, we have 7 (=00000111B). It should be noted that "B" attached to a numeral indicates that the number is a binary number.

In a case where the two colors R, B are sent, we have 5 (first color=1, third color=4: 00000101B). Similarly, in a case where COLORTYPE is YCrCb and only Y is sent, we have "1".

LEVEL comprises two bytes. The first four bits indicate the number of tones of the first color, the next four bits indicate the number of tones of the second color, and the next four bits indicate the number of tones of the third color. The final four bits are not defined.

The number of tones represented by these bits is designated by an exponent of 2, such as 256 tones in case of 8 and four tones in case of 6.

CODE indicates the coding method. Here "1" is designated if there is no coding, "1" in case of coding by ADCT, "2" in case of MMR and "3" in case of LZW.

BITRATE indicates the coding ratio of coding, in which "6" indicates a compression ratio of 1/6 and "12" a compression ratio of 1/12.

XSTEP, YSTEP designate how much of an image is to be thinned out and sent at the time of pre-scanning. For example, in a case where an image is sent every five pixels vertically and horizontally, we have XSTEP=5, YSTEP=5. If the image is not thinned out, XSTEP=0 and YSTEP=0 hold.

OCR indicates whether character recognition is to be carried out or not. When character recognition is applied to data in an area that undergoes scanning, "1" is set; if character recognition is not executed, "0" is set. Further, "2" is set in a case where position information is added on to the character recognition function; "3" is set in a case where data is converted into page description language; and "4" is set if a character of a designated color is detected and only this character is subjected to character recognition. The character of the color designated by COLOR is then recognized. Further, "5" is set if only an area of a background color whose color has been designated is subjected to character recognition. A character written in a different color in an area whose color has been designated by COLOR is recognized. Other values are options that allow the relationship between color and characters to be expanded.

The foregoing is a description of each field of the PRESCAN packet and SCAN packet. Each field of the PRINT packet will now be described, although a description of portions identical with those in the above-mentioned packets will be omitted.

UCR 178 indicates α at the time of black generation [see Eq. (3)].

BI-LEVEL 179 indicates a binarization method, in which "0" indicates that binarization is not performed in a case where the printer engine 304 is a multivalued printer. Further, "1" indicates fattening pattern in the dither method, "2" a BAYER pattern in the dither method, "3" a simple binarization method, and "4" an error calculation method.

THRESHOLD 180 indicates a binarization threshold value (0~255) in the simple binarization method.

PAGE 181 indicates the number of pages at the time of printing.

FIG. 16D illustrates an OK packet. This packet is merely an OK tag of one byte.

FIG. 16E illustrates a GAMMA packet, in which S/P182 of a second byte indicates whether to set the gamma table of the image processing circuit 302 for the scanner or the image processing circuit 303 for the printer in the copier 103. From this point onward, the gamma table is composed of 768 bytes of three colors each consisting of 256 bytes.

FIG. 16F illustrates a MASKING packet constituted by a masking tag and masking parameters aij comprising a fixed decimal point of two bytes. Here aij represents the component of a matrix situated at row i and column j.

FIG. 16G illustrates a STATUS packet constituted by a status tag, a number N183 of the states, and STATUSn (n=0~N) indicating status.

FIG. 16H illustrates a DATA packet constituted by a data tag, a number N of items of image data that follow the data tag, and items of image 1, 2, 3 . . . .

FIG. 16I illustrates an ESC packet, in which the first byte is a sequence that starts at ESC. An image is developed into a bitmap or bytemap by the interpreter 212. This is equivalent to the ESC sequence of an ordinary printer.

[Constitution of commands]

Commands exchanged by the server 102 and copier 103, such as a pre-scan command, scan command, status information, gamma setting command and masking setting command are communicated in format the same as that shown in FIG. 16A to 16I.

FIG. 17A to 17H illustrate the constitution of commands exchanged by the server 102 and the copier 103. FIG. 17A shows the pre-scan command, FIG. 17B the scan command and FIG. 17C the print command. The first byte of each packet is a tag that indicates what the packet is. For example, if the packet is the PRESCAN packet, the tag is "1", which indicates pre-scanning. In case of the SCAN packet, the tag is "2", which indicates scanning.

Each field of the packets in the pre-scan, scan and print packets will now be described.

XSIZE, YSIZE indicate, by two bytes, the size of an image in the X and Y directions, respectively.

XSTART, YSTART indicate, by two bytes, scanning and printing starting position of an image in the X direction and scanning and printing starting position of an image in the Y direction.

XZOOM, YZOOM indicate, by one byte, scanning and printing resolution of an image in the X and Y directions, respectively.

FORMAT indicates the image scanning method, in which "1" designates dot sequential scanning, "2" line sequential scanning and "3" field sequential scanning.

EDGE indicates the degree of edge emphasis and smoothing, in which 16~1 designates edge emphasis and −1~−16 designates smoothing.

COLORTYPE indicates the color space of an image, in which "1" is designated for RGB, "2" for CMY, "3" for CMYK, "4" for YCeCb, "5" Lab and "6" for XYZ. In case of RGB, a first color shall refer to R, a second color to G and third color to B. In case of YCrCb, a first color shall refer to Y, a second color to Cr and a third color to Cb.

COLOR indicates which color of the image colors is to be transmitted. The particular color is assigned by bit. For example, if a color is the first color, the 0th bit is made "1"; if a color is the second color, the 1st bit is made "1"; if a color is the third color, the 2nd bit is made "1"; if a color is the fourth color, the 3rd bit is made "1".

By way of example, if COLORTYPE is RGB and all colors of RGB are sent, the 0th, 1st and 2nd bits are made "1" so that we have "7" (=00000111).

In a case where the two colors R, B are sent, similarly we have "5" (first color=1, third color=4: 00000101). Similarly, in a case where COLORTYPE is YCrCb and only Y is sent, we have "1".

LEVEL comprises two bytes. The first four bits indicate the number of tones of the first color, the next four bits indicate the number of tones of the second color, and the next four bits indicate the number of tones of the third color. The final four bits are not defined. The value of a LEVEL field designates, by an exponent of 2, the number of tones of each color, such as 256 tones in case of 8 and four tones in case of 6.

CODE indicates the coding method. Here "0" is designated if there is no coding, "1" in case of coding by ADCT, "2" in case of MMR and "3" in case of LZW.

CODE indicates the coding method. Here "0" is designated if there is no coding and "1" in case of coding by ADCT.

UCR indicates a at the time of black generation [see Eq. (3)].

BI-LEVEL indicates a binarization method, in which "0" indicates that binarization is not performed in a case where the printer engine 606 is a multivalued printer. Further, "1" indicates a fattening pattern in the dither method, "2" a BAYER pattern in the dither method, "3" a simple binarization method, and "4" an error diffusion method.

THRESHOLD indicates a binarization threshold value (0~255) in the simple binarization method.

PAGE 181 indicates the number of pages at the time of printing.

FIG. 17D, which is one type of status information, illustrates OK. This is an OK tag of one byte.

FIG. 17E illustrates a gamma setting command. Here S/P of a second byte indicates whether to set the gamma table of the image processing circuit 302 for the scanner or the image processing circuit 303 for the printer in the copier 103. From this point onward, the gamma table is composed of 768 bytes of three colors each consisting of 256 bytes.

FIG. 17F illustrates a MASKING packet constituted by a masking tag and masking parameters comprising a fixed decimal point of two bytes. The content of the command has a meaning identical with that of FIG. 16F.

FIG. 17G illustrates status information constituted by a status tag, a number N of the states, and N-number of states (STATUS 1~N) indicating status.

FIG. 17H is a copy command. This is merely a copy tag of one byte.

A command sequence for using the copier 103 from the client process 105 will now be described.

<Description of command sequence (FIGS. 13–15)>
[Scanner side]

As shown in FIG. 13, first the client process 105 sends the server process 106 (arrow 131) a PRESCAN packet P1 comprising the XSIZE, YSIZE, XSTART, YSTART, XSTEP, YSTEP of the image. XSIZE, YSIZE, etc., are parameters that designate the size, etc., of an image that is to be read in.

In order to perform coding of the image and thinning-out at the time of pre-scanning of the image, the coding method as well as the bit rate and thinning-out ratio at the time of coding are set in the server process 106 when the PRESCAN packet P1 is received. All other information is sent from the serial interface 215 to the copier 103 as a pre-scan command (arrow 132).

In accordance with the information of the pre-scan command, the copier 103 sets the parameters in the image processing circuit 302 on the scanner side. If these parameters have been set correctly, an "OK" response is sent back to the server process 106 (arrow 133). When the server process 106 receives the "OK" response from the copier 103, it sends an OK packet P4 back to the client process 105 (arrow 134). If the parameters have not been set correctly, status information is sent back to the server process 106 instead of "OK". When the copier 103 receives the pre-scan command, it reads out the image one line at a time. At the time of pre-scanning, the video-interface control circuit 216 of the scanner/printer server 102 raises the output timing signals HSYNC 110, VSYNC 109, CLOCK 108 and DATA 111 to a high impedance, and the server 102 reads in data from DATA 111 (arrow 135), and writes it in the buffer memory 209, in synchronism with the input timing signals HSYNC 110, VSYNC 109 and CLOCK 108 generated by the copier 103.

At this time, the image is thinned out in accordance with the thinning-out ratio of XSTEP, YSTEP commanded by the PRESCAN packet P1, the image data is split into a suitable size or joined and a plurality of DATA packets P2 comprising a DATA tag, the number of bytes of the packet and the image data are constructed. These are sent to the client process 105 of the host computer 101 (arrow 136).

In the client process 105 of the host computer 101, the thinned-out data is extracted from the image packet P2 received from the server process 106 and the data is displayed on a CRT (not shown). If all of the image data has been sent normally, the copier 103 sends "OK" from the serial interface 307 to the server process 106 (arrow 137). When "OK" is received from the copier 103, the server process 106 sends the OK packet P4 to the client process 105 (arrow 138).

When the OK packet P4 is sent to the client process 105, the server process 106 waits for the next command packet from the client process 105. The client process 105 receives all of the thinned-out image data, displays it on the CRT and asks the user which area of the image is actually to be read.

In response, the user employs a pointing device such as mouse to designate which area is actually to be scanned. The user designates also whether the designated area or color character is to be subjected to character recognition. The start of scanning is indicated to the client process 105.

When this is done, the client process 105 sends the server process 106 (arrow 139) a SCAN packet P3 comprising the XSIZE, YSIZE, XSTART, YSTART of the image.

When the SCAN packet P3 is received in the server process 106, "OK" is sent back to the client process 105 (arrow 1310), through a procedure similar to that of PRESCAN, if this information has been set correctly.

The server process 106 reads in the image from the copier 103 again in accordance parameters that have been designated by the SCAN packet (arrow 1311).

In a case where an ordinary image has been read in, the image data is split into an appropriate size or joined and a plurality of DATA packets comprising a DATA tag, the number of bytes of the packet and the image data are constructed. These are sent to the client process 105 of the host computer 101.

In the client process 105 of the host computer 101, the image data is extracted from the image packet P2 received from the server process 106 and the data is written in successively.

If all of the image data has been sent normally, the server process 106 sends the OK packet P4 to the client process 105 (arrow 1313). When the OK packet is sent to the client process 106, the server process 106 waits for the next command packet from the client process 105. When the OK packet is received from the server process 106, the client process 105 waits for the next command from the user.

In a case where the destination of character code information is a transfer to another party on the public switched telephone network owing to an indication from the host computer 101, there are two transfer paths. In a case where the server 102 has a communication controller, a direct transfer is made from the server 102 to the public switched telephone network. If the host computer 101 has a communication controller, data is transferred from the server 102 to the host 101 and the client process 105 receives the data and transfers it on the public switched telephone network.

[Printer side]

Figure 14:
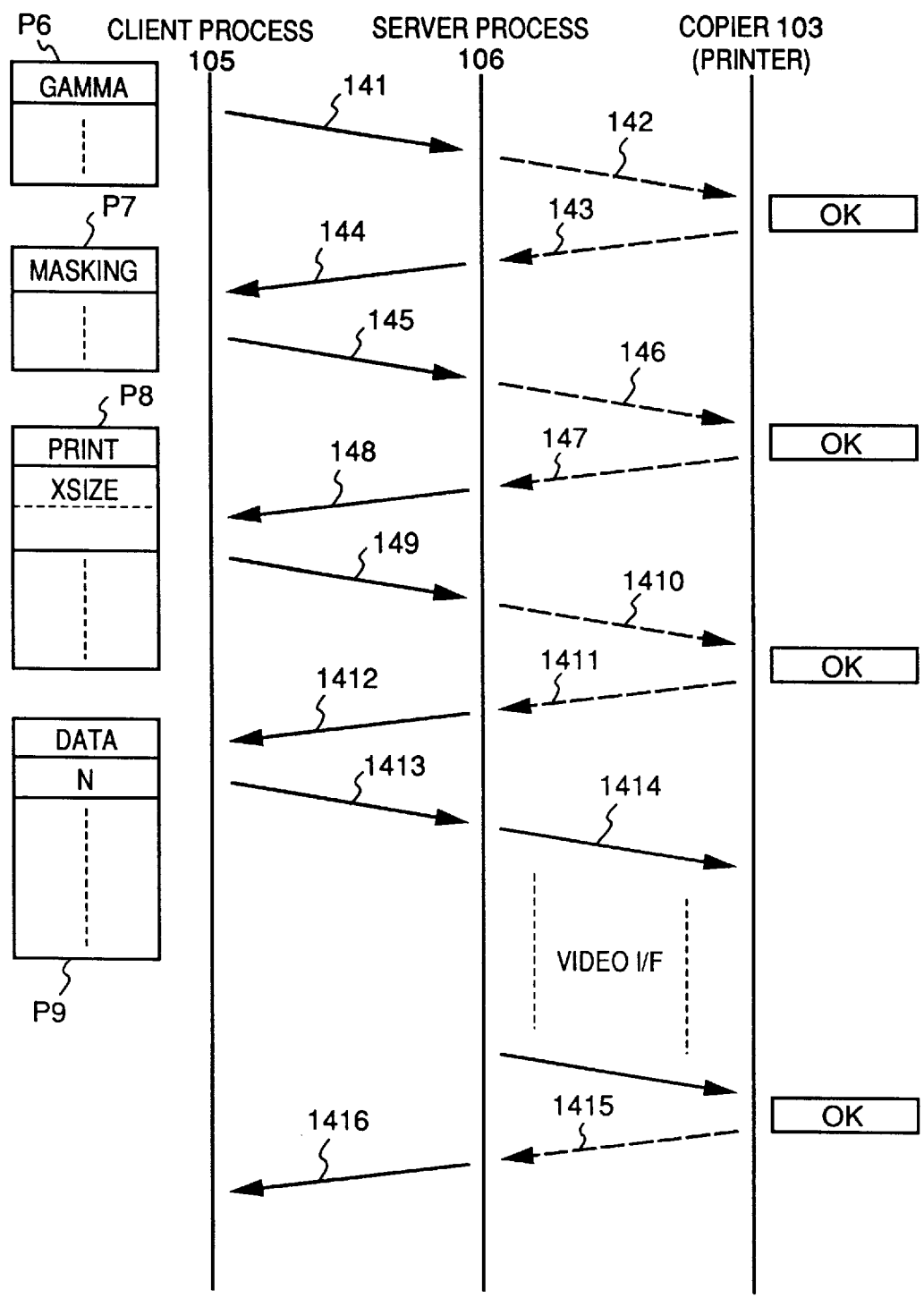
FIG. 14 is diagram showing a transition in printer status.

FIG. 14 is a diagram for describing the printing operation. The exchange of data among the client process 105 of the host computer 101, the scanner/printer server 102 and the copier 103 at the time of printing will be described in accordance with FIG. 14.

First, in the host computer 101, the user designates the names of files in the host computer 101 holding the size of the image to be printed, the position of the image to be printed and the image to be printed. As for parameters for gamma conversion and masking conversion, etc., at the time of printing, default values usually are set. However, these can be changed.

In this case, in FIG. 14, first the client process 105 sends a GAMMA packet P6 to the server process 106 (arrow 141) in order to set a gamma table for gamma conversion at the time of image printing. If the gamma table has already been set, it is unnecessary to send this packet. If the GAMMA packet P6 is received, in the server process 106, a gamma-table setting command is sent, via the video I/F, to the printer side of the copier 103 if the second byte of the GAMMA packet indicates the printer and to the scanner side if the second byte indicates the scanner (arrow 142). In this case, the printer of the copier 103 is used and therefore the gamma conversion table is set on the printer side.

The copier 103 sets the LUT of the printer gamma converter 502 in accordance with the parameters of the gamma setting command. If the LUT can be set normally, "OK" is sent back to the server process 106 (arrow 143). When "OK" is received from the copier 103, the server process 106 sends back the OK packet P4 to the client process 105 (arrow 144).

Next, the client process 105 sends a MASKING packet P7 to the server process 106 in order to set the masking table at the time of image printing. If the masking table has already been set, it is unnecessary to send the packet. If the MASKING packet P7 has been received in the server process 106, the masking setting command is sent to the copier 103 (arrow 146). The copier 103 sets the parameters in the masking converter 503 within the image processing circuit 303 on the printer side in accordance with the parameters of the masking setting command. If the parameters have been set normally, "OK" is sent back to the server process 106 (arrow 147). When "OK" is received from the scanner, the server process 106 sends the OK packet P4 back to the client process 105 (arrow 148).

When setting of the parameters for gamma conversion and masking conversion is completed in the manner described above, the client process 105 sends the server process 106 a PRINT packet P8 comprising XSIZE, YSIZE, XSTART, YSTART, PAGE, etc., of the image (arrow 149).

When the PRINT packet P8 is received in the server process 106, the PRINT command is sent from the serial interface 215 to the copier 103 (arrow 1410). When the copier 103 receives the information of the print command correctly and sets the parameters, the copier sends "OK" back to the server process 106 (arrow 1411). When "OK" is received from the scanner, the server process 106 sends the OK packet P4 back to the client process 105 (arrow 1412).

When "OK" is received in the client process 105, the image is read out of the designated file. The client process 105 splits the image data that has been read into an appropriate size or joins the data to construct a plurality of DATA packets P9 comprising a DATA tag, the number of bytes of the packet and the image data. These are sent to the server process 106 (arrow 1413). In the server process 106, the image data is extracted by the image packet P9 received from the client process 105 of the host computer 101 and the print data is sent successively to the copier 103 via the video I/F (arrow 1414).

At the time of printing, the video I/F control circuit 216 of the scanner/printer server 102 outputs the group of synchronizing signals HSYNC 110, VSYNC 109 and CLOCK 108, as well as the image data synchronized to these signals, to DATA 111, and the copier 103 reads the data that is to be printed from DATA 111 in synchronism with the group of synchronizing signals and prints out this data.

If the entire image is printed correctly, the copier 103 sends "OK" from the serial interface 307 to the server 102 (arrow 1415). When "OK" is received from the copier 103, the server process 106 sends the OK packet to the client process 105 (arrow 1416). When the OK packet is sent to the client process 105, the server process 106 waits for the next command packet from the client. The client process 105 starts waiting for the next command from the user at the moment the OK packet is received from the server process 106.

In the print operation described above, a case is described in which the image data is sent from the host computer 101 in response to an instruction from the client process. However, there are also cases in which the scanner/printer 102 reads in the image data from the scanner of the copier 103, makes a conversion into page description language and changes the type, size or color of the character and then performs printing. Similarly, there are cases in which a character code or the like is accepted from a public switched telephone network, bit development is performed within the scanner/printer server 102 and printing is performed.

[Error]

Figure 15:
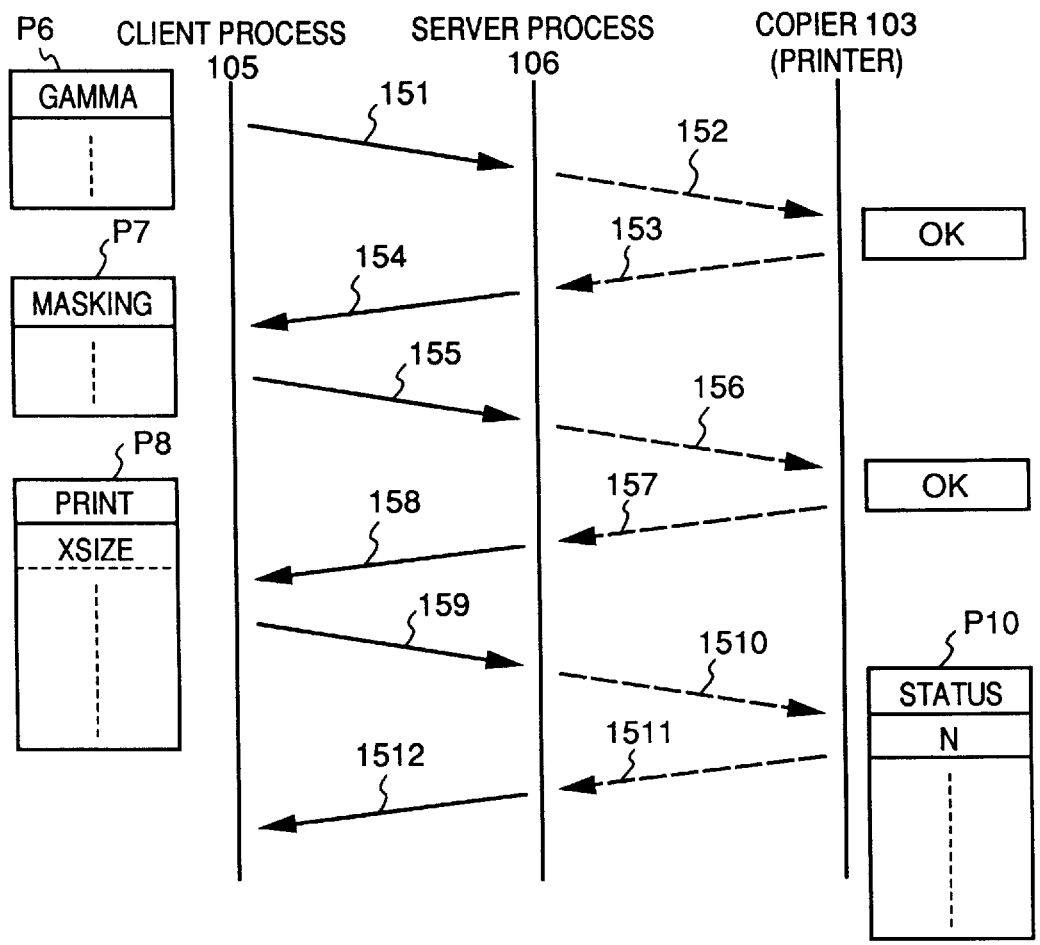
FIG. 15 is diagram showing a transition in error status.

FIG. 15 is a diagram for describing a case in which an error is generated at the time of printing. Exchange of data among the host computer 101, scanner/printer server 102 and printer 103 at the time of printing will be described with reference to FIG. 15.

As in the case of printing described above, the client process 105 sets the gamma table and masking table at the time of image printing. Next, the client process 105 sends the server process 106 the PRINT packet P8 comprising XSIZE, YSIZE, XSTART, YSTART, PAGE, etc., of the image. When the PRINT packet P8 is received in the server process 106, the PRINT command is sent from the serial interface 215 to the copier 103 (arrows 151~1510).

If the values of the parameters of the print command are improper, or in the occurrence of an abnormality, such as an inability to set the values, or an error such as lack of paper, the copier 103 sends status information, which indicates the error status, back to the server process 106 (arrow 1511).

When the server process 106 receives the status information from the copier 103, it converts the status information into a STATUS packet P10 and sends this packet back to the client process 105 (arrow 1512).

When the client process 105 receives the STATUS packet P10, it outputs an appropriate message to the user in accordance with the status to inform the user of the fact that an error has occurred. If an error such as paper jamming has occurred during printing, the CPU 306 of the copier 103 immediately suspends the printing operation and transmits the status information of the error from the serial interface 307 to the server process 106.

When the status information from the printer side 103 is received in the server process 106, the status information is sent to the client process 105 as a STATUS packet P10 and the next command is awaited.

When the STATUS packet P10 is received, the client process 105 outputs an appropriate message to the user in accordance with the status to inform the user of the fact that an error has occurred.

[Character recognition server]

There is also a case in which the character recognition means and automatic translating means within the scanner/printer server 102 are used from the host computer 101. In this case, character image data of a desired area is clipped in advance on the side of the host computer 101, and the client process 105 sends the character image data to the server process 106. Processing similar to that for the case in which the image is read in by the copier 103 is executed within the server 102, and a character code is sent to the host computer 101 through the network 104. In this case, the copier 103 does not take part in processing, a message sent from the host 101 to the server 102 is processed by the server 102 and a command to undergo processing is not delivered to the copier 103.

If a copier that is constructed and functions in the above-described manner and its server system are used, the following effects are obtained:

(1) The copier can be combined with a scanner/printer server, which is capable of performing character recognition, and can used as a common resource in a network. In other words, the network user is capable of sharing the server function as well as the copier.

(2) A character-image original is read from the scanner and a character code is obtained. As a result, the amount of data is reduced and the load upon the network diminished, thereby raising the processing speed of the computer and improving operability.

(3) The character-image original read in by the scanner can be converted into page description language automatically.

(4) A colored character-image original can be read in and characters of a designated color can be extracted from the original.

(5) The type and size of characters in the character-image original that has been read in can be changed and then printed.

(6) The character-image that has been read in can be subjected to character recognition, converted into character codes and translated automatically.

(7) The host computer in the network is capable of utilizing only the character recognition function of the server.

(8) A character-image original is subjected to character recognition and can either be sent to a public switched telephone network or received as a character code and then printed.

(9) An image read in by the scanner is converted into PDL, thereby making it possible to reduce the image data. The memory required for the image data can be reduced and the time required for transferring the image data can be shortened.

In this embodiment, a case is described in which the bus-type network 104 is used as the network. However, the network may be of any type. For example, an FDDI employing a token ring or optical fibers is capable of being used as the network means.

Further, in this embodiment, a case is described in which serial communication is used in order to communicate data such as commands, parameters and errors between the scanner/printer 102 and the copier 103. However, the invention is not limited to serial communication. Any two-way communication interface can be employed.

In this embodiment, serial communication is used to communicate data such as commands, parameters and errors between the scanner/printer 102 and the copier 103, and a video interface is used to communicate image data. However, the invention is not limited to these communication interfaces. Information such as commands, parameters and errors and image data can be communicated on the same communication line using an interface, such as an SCSI or GPIB, that is capable of two-way communication.

In this embodiment, an image is sent upon being coded by the ADCT coding method in a case where the image has a dot-sequential YCrCb format. However, the invention is not limited to ADCT coding and any coding method can be used. As a result, coding can be applied to an image other than those having the dot-sequential YCrCb format, and the image can be compressed and transmitted.

The buffer memory 209, which is for several lines, is used in the server 102. However, a memory for one screen can be provided so that speed can be raised even further.

In this embodiment, the scanner 310 of the copier 103 transmits the image upon thinning it out at the time of pre-scanning but does not thin out the image at the time of main scanning. However, in a case where a color image is pre-scanned, the following can be combined:

(1) transmission solely of single-color components;
(2) thinning out and transmission;
(3) coding and transmission;
(4) reduction of number of tones and transmission; and
(5) reduction of image resolution and transmission.

In this embodiment, the sensor 301 performs scanning three times in a case where the image is read in, scanned, converted and transferred. However, it is possible to read an image only one time, store the image data in a hard disk, read out the image from the hard disk three times and then perform scanning. As a result, mechanically scanning need be performed only once and speed can be raised.

Further, it is possible to perform scanning and conversion of a first color at the same time as the data is stored in the hard disk, with the remaining two colors being read out of the hard disk.

In this embodiment, an image is binarized by the binarizer 505 since the printer engine is a binary printer engine. However, a multivalued image can be dealt with in the same manner. This can be accomplished with ease by providing an N-value unit in case of an N-valued printer engine.

The present invention can be applied to a system constituted by a plurality of devices or to an apparatus comprising a single device. Furthermore, it goes without saying that the invention is applicable also to a case where the object of the invention is attained by supplying a program to a system or apparatus.

Further, the copier and the scanner/printer server can be unified. FIG. 18 is a diagram showing an arrangement in which the copier and scanner/printer server are combined. Though the functions provided are the same as in the foregoing embodiment, a copier 181 in FIG. 18 is such that the scanner/printer server 102 is built in the copier 103 of FIG. 1. The copier 181 performs the function of the server 102.

Though a copier has been described in the foregoing embodiment, the invention is not limited to a copier but can be applied to any apparatus, such as a facsimile machine, that has a scanner.

[Second Embodiment]

A system will now be described in which, instead of the PDL interpreter circuit 212, there is provided a PDL converter circuit, which converts a read image into PDL in order to reduce the amount of image data read in from the copier of the first embodiment.

In this embodiment, the construction of the scanner/printer server 102 is made different from that of the first embodiment. The environment of the server 102 has the arrangement of FIG. 1 or FIG. 18 of the first embodiment.

Figure 19:
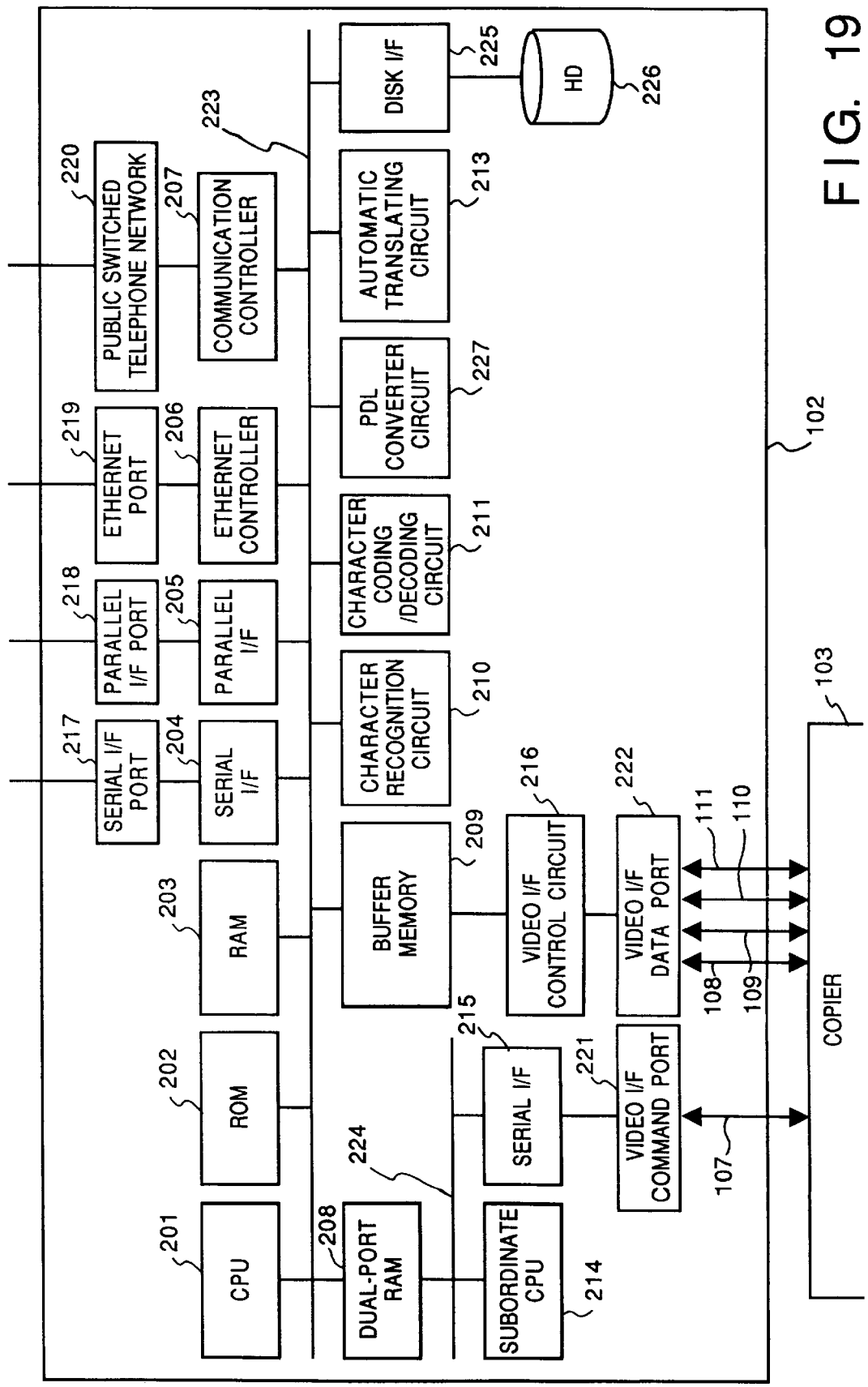
FIG. 19 is a diagram showing the internal configuration of a scanner/printer server in a second embodiment.

FIG. 19 is a block diagram showing the configuration of the scanner/printer server according to the second embodiment. Since the configuration is substantially the same as that shown in FIG. 2, only the difference between the two will be described. Specifically, FIG. 19 differs from FIG. 2 in that the PDL interpreter 212 is eliminated while a PDL converter circuit 227, a hard disk (HD) 226 and a disk interface 225 are provided anew.

[Hard disk]

The hard disk (HD) 226 is used in order to temporarily store print data (code and image data) sent from the network. By temporarily storing the print data in the HD226, the print data obtained by being transferred via the network can be received while it is being printed, thereby making it possible to execute processing that does not apply a load to the network. At the time of scanner processing, the image data that has been read in from the scanner of the copier 103 is accumulated in the buffer memory 209. This data is stored in the HD 226 after it is subjected to processing for area discrimination. When the image data is converted into page description language by the PDL converter circuit 227, the image data that has been stored in the HD 226 is read out and processed (the conversion of the image data to page description language will be described later). Consequently, scanning of the image data need not be performed again. Of course, in a case where the image data is required again, the image data stored in the HD 226 is capable of being utilized. It should be noted that the HD 226 is connected to other blocks via a DISK I/F 225. The DISK I/F 225 manages input/output of the data of the HD 226.

[PDL converter circuit]

The PDL converter circuit 227 converts an image, which has been developed in the buffer memory 209 as a bitmap or bytemap, into PDL that describes a print command to the printer. FIG. 20 is a block diagram of the PDL converter 227.

FIG. 20 is a partial circuit block diagram of the PDL converter 227 for converting the image data read in from the scanner into data described in PDL.

The image data is read in from the scanner of the copier 103 and accumulated temporarily in the buffer memory 209. A CPU 2001 analyzes the input image data, discriminates the type of image contained in the data and classifies the areas according to type. The categories are character, graphic and image, and each area and the positional information are recognized. Processing proceeds while the data obtained during the course of this area discriminating processing, such as data indicative of labeling or the like, is being saved temporarily in a RAM 2002. Using the information obtained by area discrimination, the CPU 2001 recognizes a character from the image data by the character recognition means, codes the character portion, combines it with other information and converts it into page description language. Image and graphic areas are combined with the position data of the image data and converted into page description language. The character recognition means may be provided within the PDL converter circuit and have a construction similar to that described in connection with the character recognition circuit 210. Alternatively, the character recognition circuit 210 may be utilized if desired.

The foregoing processing is illustrated in the flowcharts of FIGS. 30 through 33. The control program of these flowcharts is stored in a ROM 2003 and is executed under the control of the CPU 2001.

Figure 30:
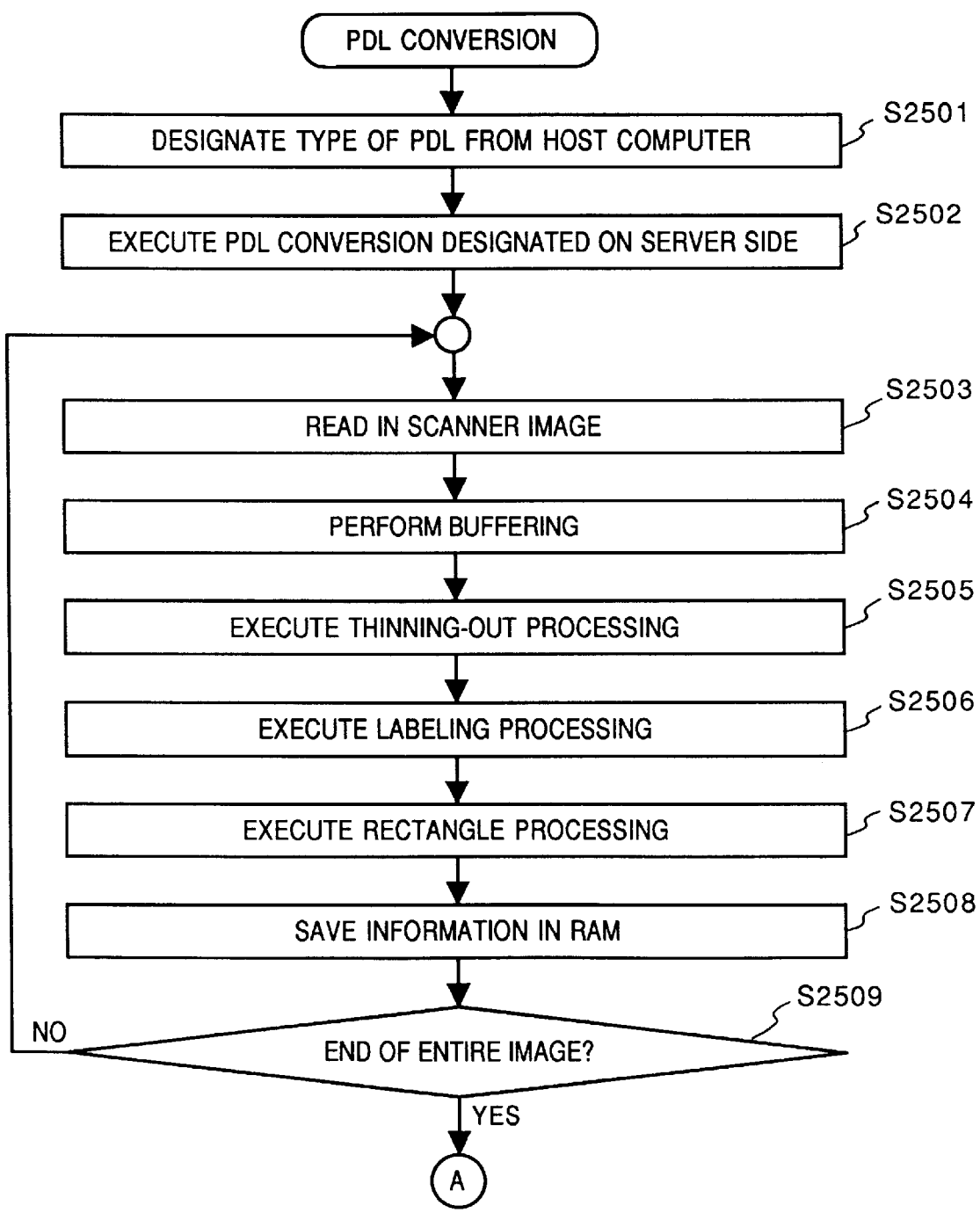
FIG. 30 is a flowchart of processing for converting an image into page description language in the second embodiment.
Figure 31:
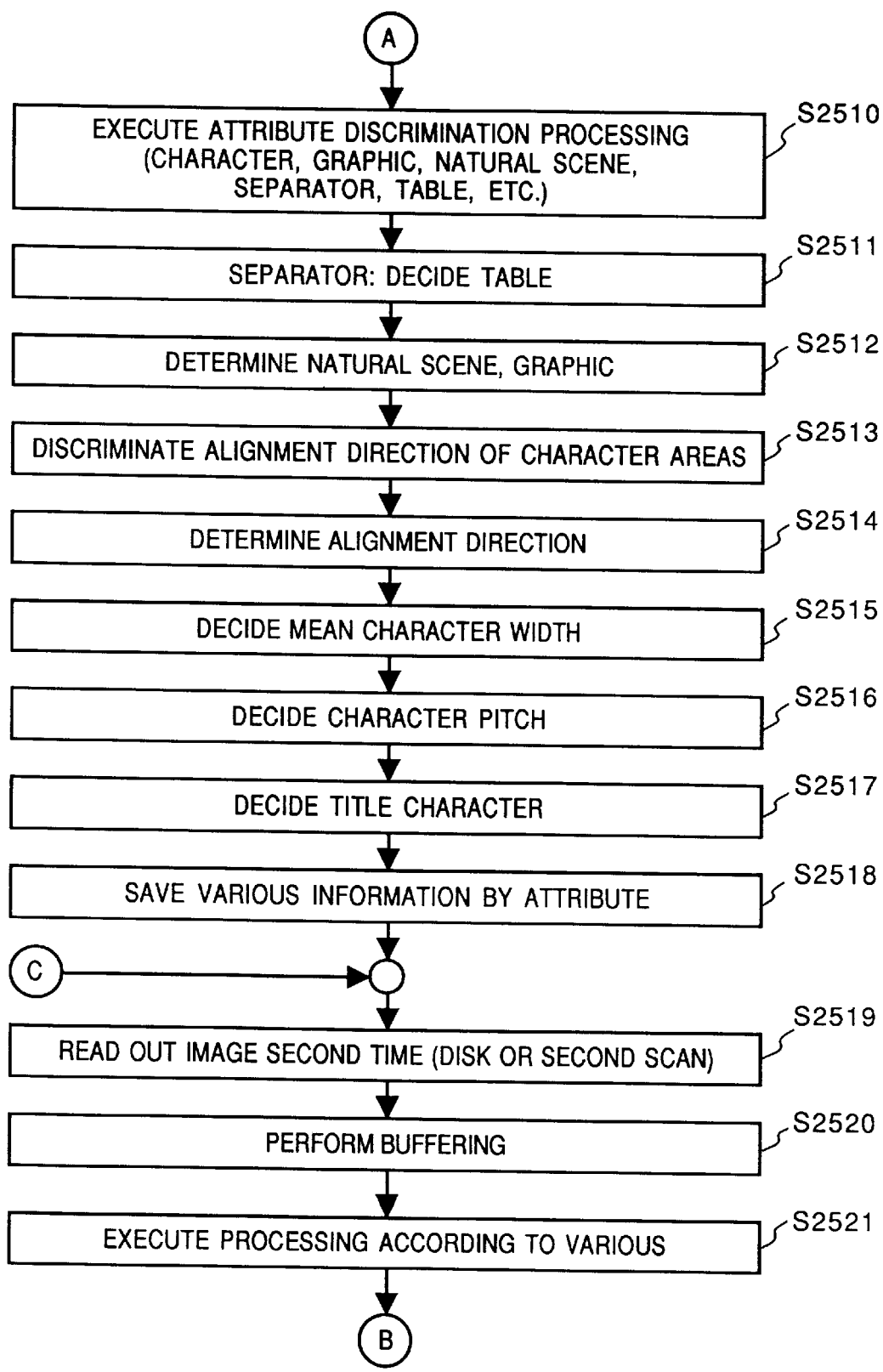
FIG. 31 is a flowchart of processing for converting an image into page description language in the second embodiment.

The processing of FIG. 30 can be divided roughly into four stages. These are initial setting processing (steps S2501, S2502), processing for discriminating areas of image information (steps S2503~S2509), processing for discriminating detailed information contained in the image information (steps S2510~S2518) and processing for converting an image into data described in PDL (steps S2519~S2521).

Each step in FIG. 20 will be described in detail.

At step S2501, a command indicating the type of PDL is inputted from the host computer 101 to the server 102 via the network 104. In subsequent processing, the image information is described in the PDL of the type designated at this time. Next, at step S2502, selection of a program conforming to the type of PDL is performed in order to extract information, which is suited to the PDL of the type designated, from the image information.

FIG. 27 illustrates an example of two types of PDL, namely CaPSL and PostScript. FIG. 27 shows an example of character and separator images using the character strings in the left column.

The following three items of information are required to convert a character portion into page description language:

1. starting-position information;

2. font information (character size, character pitch and character style); and 3. character-code information.

The character area of an image has its position and size discriminated by the area discriminating means. A character code is recognized by the character recognition means. The area discriminating means will be described later. Character size and character pitch are known from the character width and character pitch discriminated by the area discriminating means. Though character style (type of font) is capable of being recognized if the character recognition means is provided with a function for judging the features of characters, here style will be fixed to a predetermined style in order to simplify the apparatus. If the accepted information is in a PDL format on the side of the host computer, the character style can be changed in a simple manner. Consequently, major problems do not arise even if a character is fixed to a specific style.

The following three items of information are required in order to convert the separator portion into page description language:

1. starting-position information;

2. line information and line-starting information; and 3. line-end information.

FIG. 28 illustrates an example of image data indicative of a natural scene or the like. In case of a natural scene, the image data is saved as a bitmap or in compressed form. Therefore, the following three items of information are required in order to convert the natural scene into page description language:

1. starting-position information;

2. raster-image paint information (total number of bytes, width, height, resolution and compression format of the image area); and 3. image data.

The starting-position information is recognized by the area discriminating means. Since the resolution designated by the host computer at the time the scanning command is issued is received as a command, the resolution can be obtained by holding this command in advance. Width and height are obtained from the coordinate values of the rectangle surrounding the image data discriminated by the area discriminating means. The total number of bytes is found from width, height and resolution. Further, a command that designates the image coding method enters from the host computer when the scanning command is issued, and image compression is carried out in the designated format using the image coding circuit within the server 202. Consequently, by holding this designating command in advance, the compression format is obtained.

FIG. 29 illustrates an example of a graphic image. The area described by this graphic can be determined if the pixel density within the rectangle recognized as the image area is investigated. However, though recognizing a graphic and coding it is possible with regard to a simple graphic, great difficulty is encountered with regard to an image composed of a line drawing or the like. Accordingly, a graphic area is handled as image data in the same manner as an area which is a natural scene. In such case, the following three items of information are required in order to convert a graphic portion into page description language:

1. starting-position information;
2. raster-image paint information (total number of bytes, width, height, resolution and compression format of the image area); and
3. image data.

These items of data are obtained by a method similar to that used for the natural scene described earlier.

Thus, the data needed for PDL conversion differs depending upon the nature of the image, and conversion is made into codes that differ depending upon the type of PDL, as illustrated in FIGS. 27, 28 and 29. Accordingly, in order to convert image data into the PDL designated at step S2501, processing is executed in accordance with the program conforming to the designated PDL.

With reference again to FIG. 30, step S2503 is executed if the initializing processing has ended. At step S2503, the image information to undergo the PDL conversion designated from the host computer 101 enters from the scanner of the copier 103. The entered data is accumulated in the buffer memory 209 of the server 102 at step S2504, and the area discriminating processing, which is the pre-processing of character recognition and PDL conversion, starts under the control of the CPU 2001. The above-mentioned image discriminating means is realized by image discriminating processing executed by the CPU 2001.

The area discriminating processing is executed with regard to an original, read in from the scanner, which is likely to contain characters, graphics or a natural scene. When character recognition processing and conversion to PDL are performed after area discriminating processing, the image data to undergo processing is required again. Accordingly, the following methods are conceivable as methods of securing the image data that will be necessary after area discrimination.

1) The capacity of the buffer memory 209 is made large enough to accumulate one page of data.
2) The buffer memory 209 is employed as a band memory and a magnetic disk or the like capable of temporary storage is provided within the server 202.
3) The buffer memory 209 is employed as a band memory, and image input for area discrimination and image input after area discrimination are each performed by scanning the original.

Though any of these method is acceptable, in this embodiment the server is provided with the HD 226 and method 2) is adopted. The following description is premised upon the fact that the server 202 possesses means for re-obtaining image data that is to undergo discrimination after area discrimination.

Figure 22:
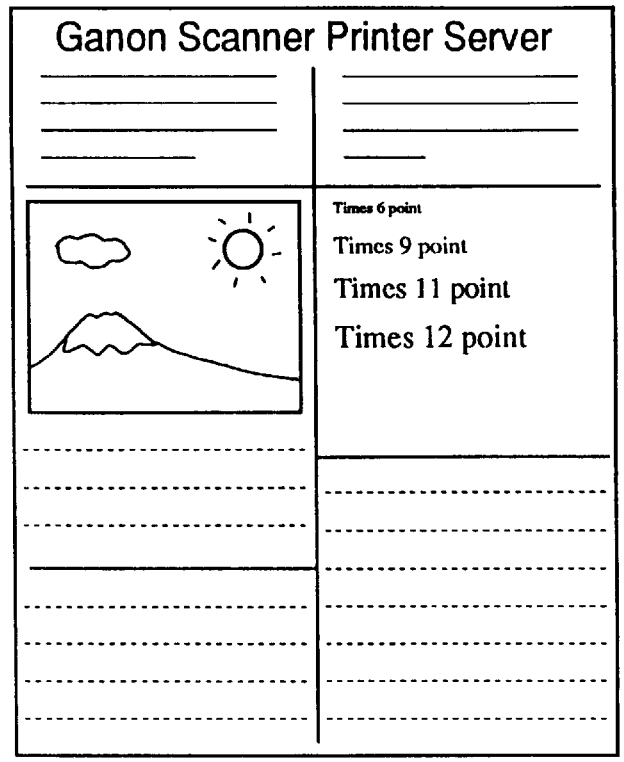
FIG. 22 is a diagram showing an example of an image containing a mix of characters and images in the second embodiment.

FIG. 22 is an example of an image original containing characters and a natural scene. As shown in FIG. 22, the character portion is partitioned into several sections. It will be assumed that the image of FIG. 22 is to undergo processing subsequently, and that the image has been stored in the buffer memory 209 after being read in from the scanner.

Figure 23A:
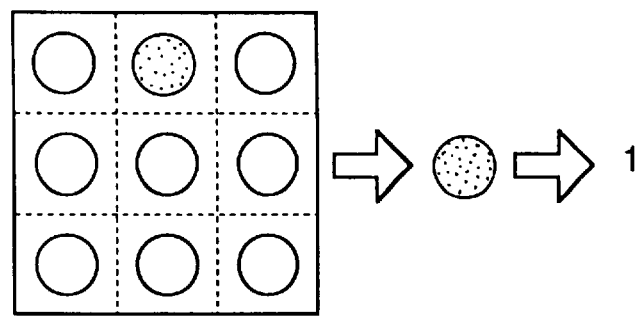
FIGS. 23A and 23B are diagrams for describing processing for thinning out an image in the second embodiment.
Figure 23B:
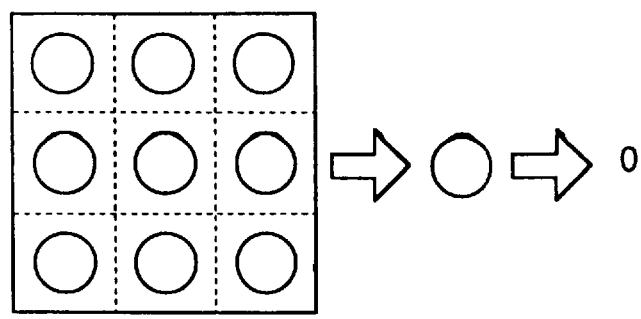

At step S2502 in FIG. 30, the image data that has been stored in the buffer memory 209 is compressed by being thinned out using an m*n matrix. In thinning-out processing, if the m*n matrix has data for which even one dot exceeds a predetermined threshold value, the dot information corresponding to this matrix is made "1", as shown in FIG. 23A. If the m*n matrix does not have data which exceeds a predetermined threshold value, the dot information corresponding to this matrix is represented by "0", as shown in FIG. 23B. The data obtained by this thinning-out processing is saved in a work area of the RAM 203.

The thinning-out processing is means for speeding up area discrimination. Discrimination of the features of the image information can be carried out sufficiently even with thinned-out information.

Labeling processing is executed at step S2506. In labeling processing, image information obtained by thinning-out processing is subjected to a search. That is, "1" pixels (referred to as "black pixels" hereinafter) are searched line by line and a label is attached thereto. Pixels that are contiguous vertically, horizontally or diagonally are assigned the same label, and pixels are grouped by enclosing groups of contiguous pixels in rectangles. The labels referred to here are for discriminating contiguous pixels. In the labeling processing, pixels are replaced by characters or character strings, such as A, B, C.

The labeling processing procedure will be described with reference to FIGS. 24A and B. Image information exemplified by FIG. 24A has a black pixel at the third pixel from the left on the first line. Accordingly, the label "A" is attached to the third pixel. White-pixel portions are made "0". Though the fifth pixel is a black pixel, the fourth pixel is a white pixel and therefore the third and fifth black pixels are not contiguous. Accordingly, a label "B", which is different from that of the third pixel, is attached to the fifth pixel. The eighth through tenth pixels on the first line are contiguous black pixels but these are not connected to "B" of the fifth pixel. Accordingly, each of these contiguous black pixels is assigned a label "C". Next, the second line is searched. Since the third pixel on the second line is a black pixel and the pixel contiguous to this black pixel from above it has already been assigned the label "A", this black pixel also is assigned the same label "A". Since the fourth pixel has the black pixel A neighboring it on the left, this pixel also is assigned the label "A". Accordingly, though the fifth pixel on the first line was labeled "B", this pixel is diagonally contiguous to the fourth pixel on the second line and therefore the label of the fifth pixel on the first line is changed to "A".

Figure 24A:
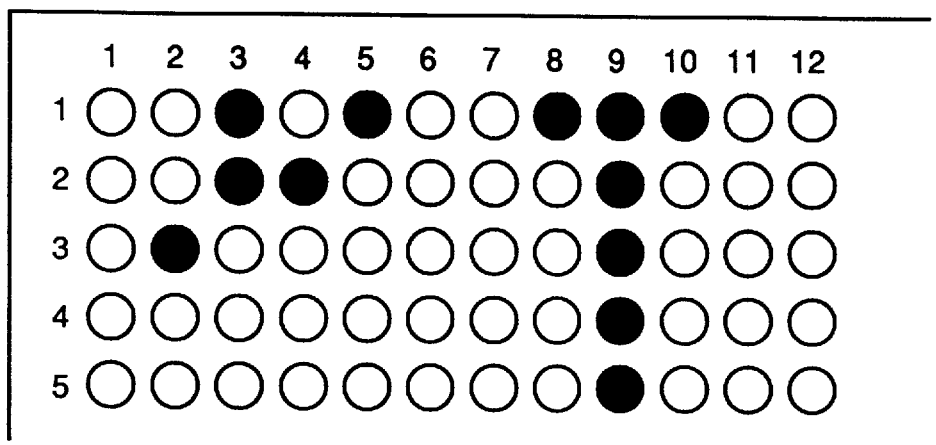
FIGS. 24A and 24B are diagrams for describing processing through which an image is partitioned into rectangles.
Figure 24B:
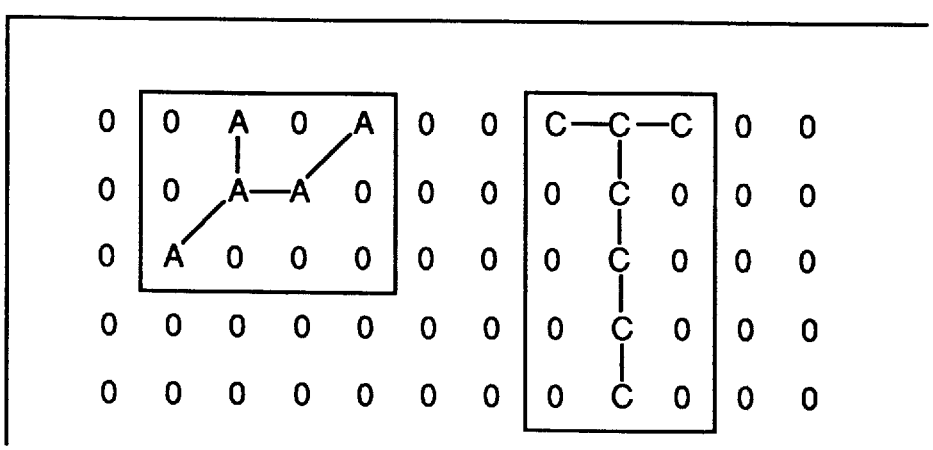

By repeating the same processing, the images of FIG. 24A can be labeled by the labels A and B, as shown in FIG. 24B.

When labeling processing has concluded, rectangle forming processing is executed at step S2507. In this processing, contiguous pixels are enclosed by a rectangular frame. To this end, maximum vertical and horizontal circumscribing lines of each label are stored in advance. The maximum circumscribing lines are determined by the maximum and minimum value of coordinates (x,y) of pixels to which the same label has been assigned. The area that contains contiguous black pixels thus becomes a rectangle having one label assigned thereto. The data that has been labeled is saved in the work area of the RAM 203 at step S2508.

The above-described thinning-out processing and labeling processing are executed whenever image data enters the buffer memory 209. Processing is repeated until it is determined at step S2509 that the entire image has been processed.

After labeling processing (step S2506) and rectangle forming processing (step S2507), rectangle-size information such as the width W, height H, area S and pixel density D is extracted from the extracted rectangle information and the attributes of the rectangle, such as character, graphic, natural scene, table or separator, which separates the end of a paragraph by a frame or line in a sentence, are discriminated at a step S2510.

The criteria for judging the rectangle size information for the purpose of discriminating each of these attributes will be described.

Figures 25A, 25B, 25C:
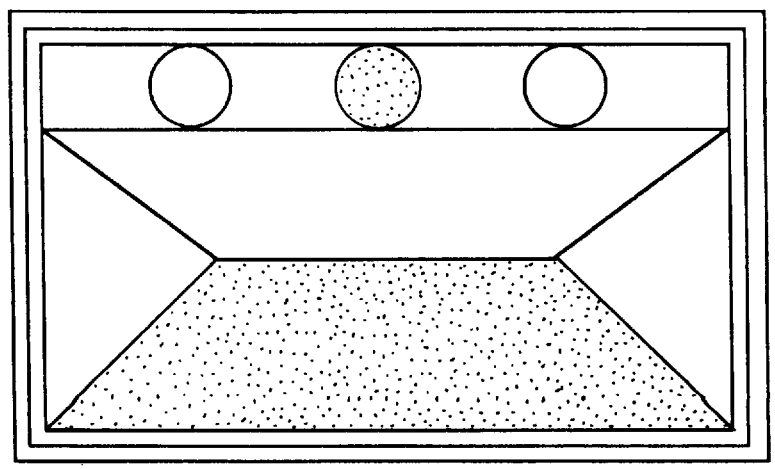

If rectangles in which characters are present are contiguous with widths W and heights H of a predetermined size and there is a moderate amount of blank space in the rectangles, as shown in FIGS. 25A and 25B, these rectangles are judged as being character areas.

If a rectangle in which a graphic is present has a size in excess of a certain level and the pixel density D within the enclosed area is less than a fixed value, as shown in FIG. 25C, this rectangle is judged as being a natural-scene area.

As shown in FIG. 25E, a rectangle in which a separator is present may have a width W or height H in excess of a fixed length (this is a continuous separator, such as a straight line). In another example, rectangles may have a width W and height H of a fixed length and be contiguous (a discontinuous separator such as a dashed line), or a rectangle may have a width W and height H in excess of a certain size, in which the inner side and outer side have the same circumscribing lines (as in the case of an enclosure). These rectangles are judged as being separator areas.

A rectangle in which a table is present, as shown in FIG. 25F, is judged based upon the following criteria: Specifically, if a rectangle has a size in excess of a predetermined size, the pixel density within the enclosed area is less than a fixed value (i.e., the interior of the area has a blank space) and the area is partitioned by lines such as a separator, this rectangle is judged as being a table area.

The attribute information of an image judged in the manner described above is saved in the RAM 203 along with the rectangle information.

When the attribute information of all rectangles in the input image has been judged at step S2510, more detailed judgment of features is performed for each and every attribute.

To this end, information of a rectangle saved in the RAM 203 as a separator is read out at step S2511, line thickness and line type (solid or broken) is decided based upon the rectangle size information, this is coded and the codes are saved in the RAM 203. Further, the information of the rectangle saved in the RAM 203 as a table is read out, and information indicative of the position and thickness of the frame forming the table is coded. Character areas within the table are registered in the RAM 203 anew as character rectangles, character recognition is performed by a character recognition function described below, and coding is then carried out.

The rectangle information that has been saved in the RAM 203 as a natural scene or graphic is read out at step S2512 and the information indicative of position and frame is coded. Since processing for recognizing a graphic and coding it is fairly complicated, this processing is not carried out. Although the attribute information of a graphic area differs from the attribute information of natural scene, the graphic image data is handled as a bitmap in the same manner as a natural scene. In a case where compression processing is performed, processing suited to the type of image data is applied.

Figure 26:
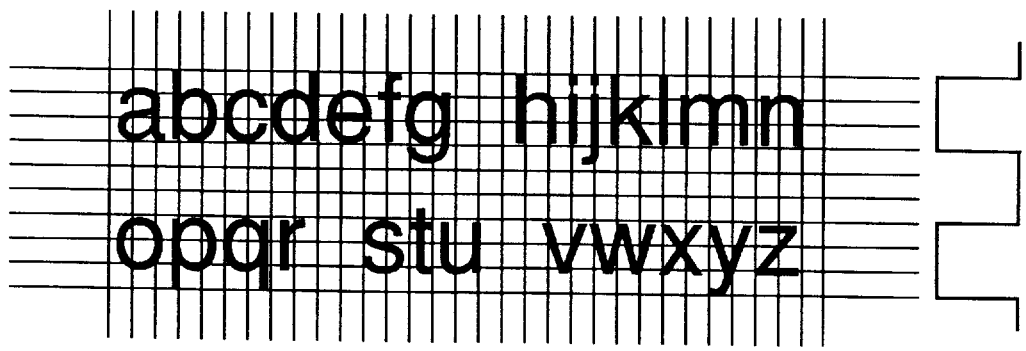
FIG. 26 is a diagram useful in describing processing for recognizing the direction in which characters are arranged in the second embodiment.

At step S2513, the information of a rectangle saved in the RAM 203 as a character area is read out, a histogram of black pixels is calculated at several locations in each of the vertical and horizontal directions, and the characteristics thereof are analyzed (i.e., subjected to projective analysis). FIG. 26 illustrates the histogram. At step S2514, it is decided, based upon the dispersion of the amount of black pixels and the spacing of the white pixels, whether the character string in these rectangular areas has been written vertically or horizontally.

Next, at step S2515, the average of the height H and width W of the character rectangle information read out is obtained in accordance with the typesetting direction determined at step S2514, and character width is decided.

This is followed by step S2516, at which the spacing between rectangles is obtained from the character rectangle information read out, and character pitch is analyzed.

Next, a character not in conformity with the character widths determined by step S2516 is judged at step S2517 to be a header character based upon these character widths. The area of a header character also is subjected to analysis of rectangle height H and width W, character size and pitch, and this area is coded accordingly.

This is followed by step S2518, at which the code information obtained by analysis at steps S2511~S2517 is saved in the RAM 203 along with the attribute information.

When the information analysis of every rectangle performed by the area discriminating means ends, the image data is read in again successively from the initial position at step S2519 and the data is accumulated in the buffer memory 209 again at step S2520. Thereafter, processing for converting the image data, which has been accumulated in the buffer memory 209, into PDL starts from step S2521.

At step S2521, one band of the image that has been accumulated in the buffer memory 209, as well as the image attribute data and position data of the image that has been saved in the RAM 203, is converted into the PDL designated at step S2501. The detailed procedure of the processing executed at step S2521 is illustrated in the flowcharts of FIGS. 32~33, each of which will now be described.

Figure 32:
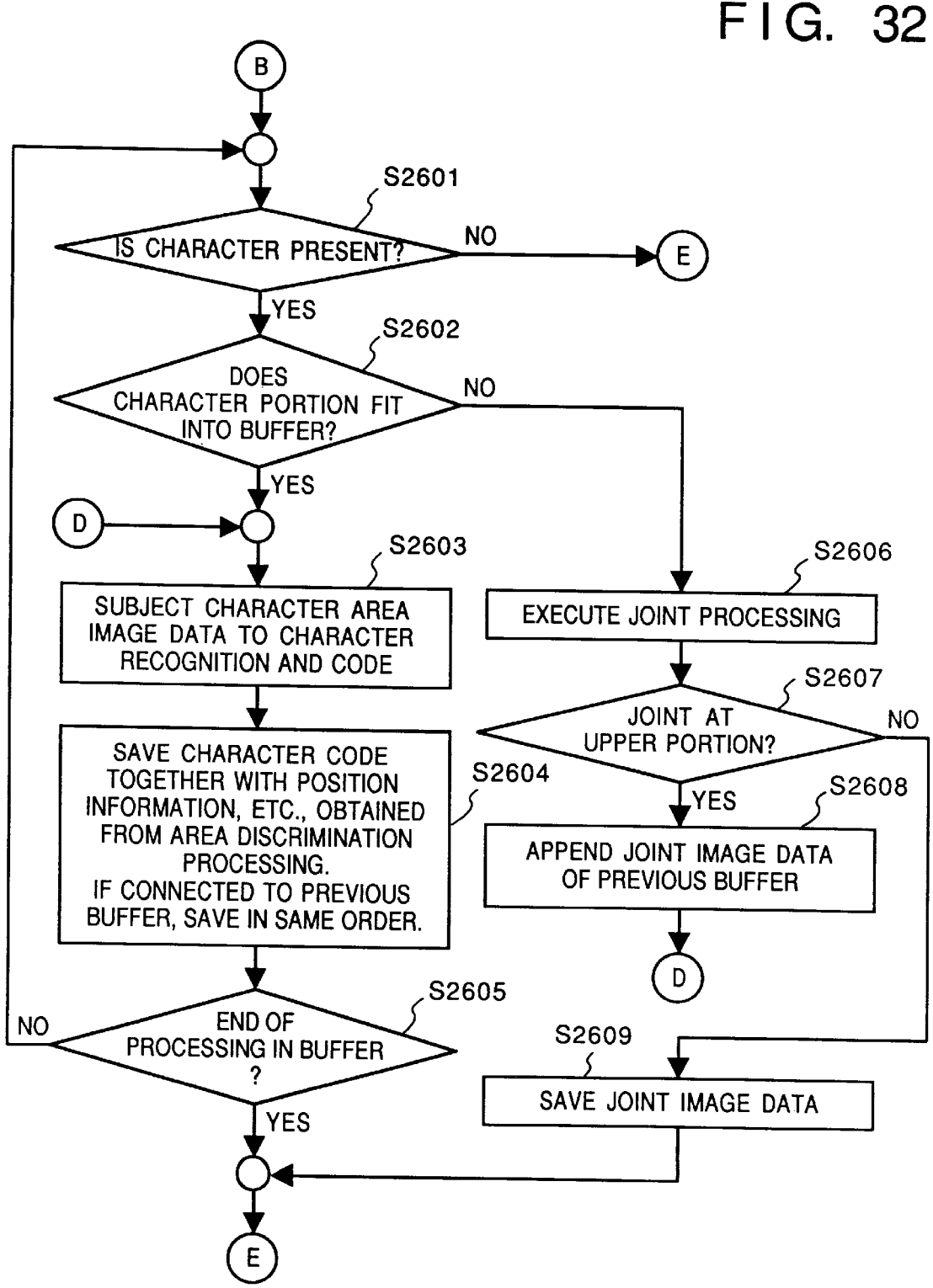
FIG. 32 is a flowchart of processing for converting an image into page description language in the second embodiment.
Figure 33:
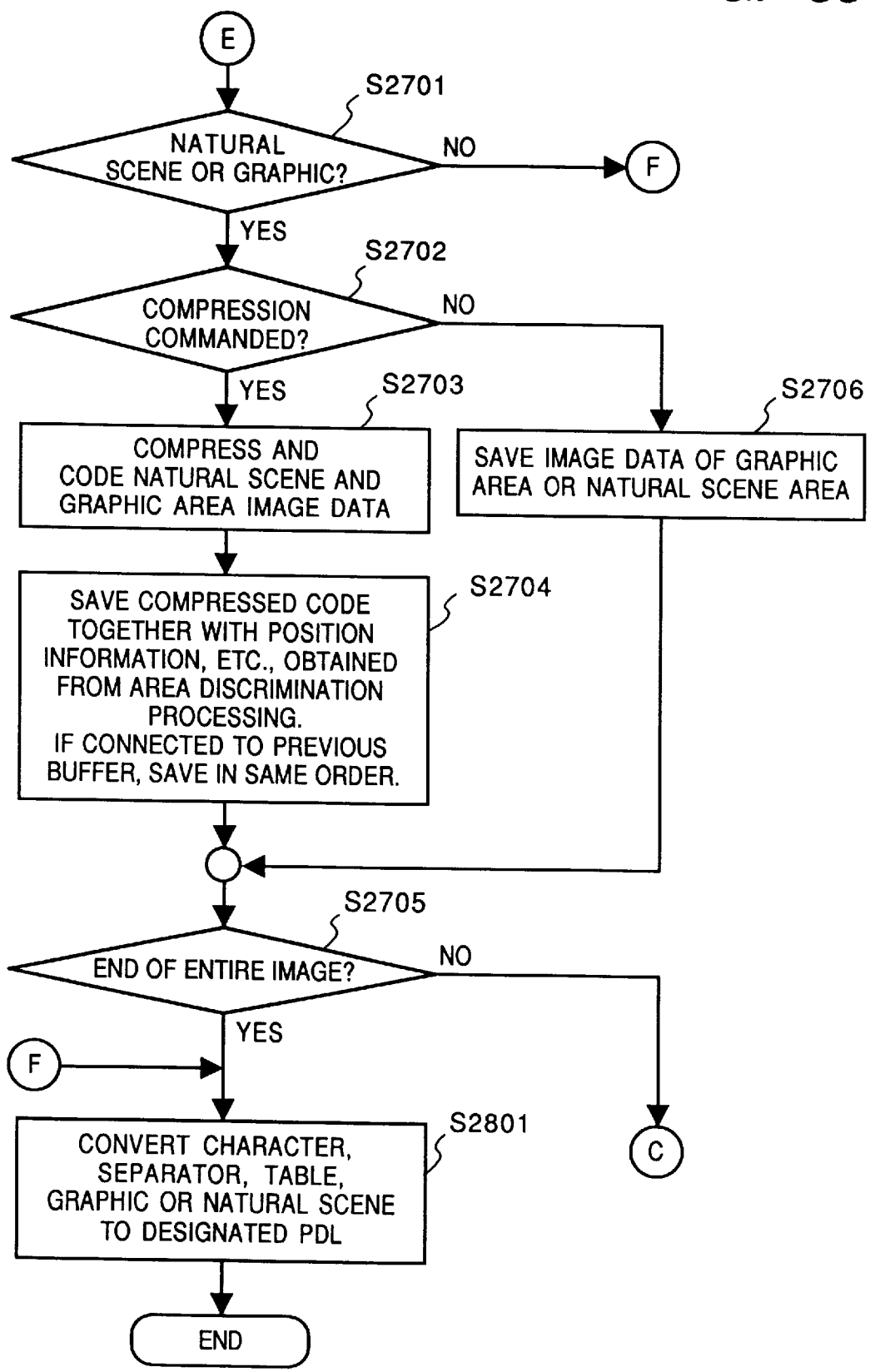
FIG. 33 is a flowchart of processing for converting an image into page description language in the second embodiment.

The flowchart of FIG. 32 represents processing for ordinary character portions as well as for character portions within a table.

It is determined at step S2601 whether the image data accumulated in the buffer memory 209 at step S2520 contains an ordinary character portion or a character portion within a table. This determination is made in accordance with the attribute information and rectangle position information saved in the RAM 203. In a case where the image contains a character, processing for this character portion or for a character portion in a table is continued. If the image does not contain a character, the program branches to symbol E in FIG. 33 so that a transition is made to processing for a natural scene and graphic.

If a character portion is present in the buffer, it is determined at step S2602 whether the entire character portion fits in the buffer memory 209. This determination is made based upon the position information in RAM 203.

If the answer at step S2602 is "NO", then the program branches to step S2606, at which joint processing is executed. Next, it is determined at step S2607 whether the joint is at the upper portion. If the answer is "NO", then the program branches to step S2609, at which the joint-image data is saved in the RAM 203.

If it is determined that the joint is at the upper portion, then the joint-image data of the band of the upper portion already saved in the RAM 203 is added on to the image data, which has been accumulated in the buffer memory, at step S2608, after which the program branches to step S2603.

If it is determined that the character portion accumulated in the buffer memory 209 fits in the memory, or if the adding on of the joint data at step S2608 is finished, then the character contained in the image data is recognized by the character recognition circuit 210 and the character is converted into a character code at step S2603. The program then proceeds to step S2604, at which the rectangle position information, for which there is character information, that is obtained from the recognition discriminating processing and saved in the RAM 203 is re-saved in the RAM 203 together with character code obtained.

The foregoing processing is repeated while a check is performed to determine whether the processing of the character area in the buffer memory 209 has ended.

The flowchart of FIG. 33 is processing for natural-scene portions and graphic portions.

It is determined at step S2701 whether the image data accumulated in the buffer memory 209 at step S2520 contains a natural-scene portion or a graphic portion. This determination is made in accordance with the attribute information and rectangle position information saved in the RAM 203. If the image contains a natural scene or graphic, processing for natural-scene portion or graphic portion is continued. If the image does not contain a natural scene or graphic, the program branches to step S2801 so that a transition is made to processing for a natural scene and graphic.

If a natural scene or graphic data is present in the buffer, it is determined at step S2802 whether a compression command for this data has entered from the host computer. It should be noted that the compression command enters, together with the command indicating the type of PDL,. at step S2501.

If compression is commanded, the program proceeds to step S2703. Here the image data of each area is compressed and coded by each designated compression method. For example, ADCT processing is used in case of a natural scene, and MMR processing is used in case of a graphic.

If compression is completed, the compressed code is re-saved in the RAM 203 together with the position information obtained from the area discriminating processing and saved in the RAM 203. If the natural scene or graphic is connected to the previous buffer, then it is saved in a form contiguous with the data in the previous buffer.

If it is determined at step S2702 that there is no compression command, then the image data of the graphic area and natural-scene area accumulated in the buffer memory 209 is re-saved as is in the RAM 203 together with the position information that has been saved in the RAM 203.

If the saving of data in the buffer memory 209 ends, it is determined at step S2705 whether the processing for the entire image of interest has ended. If processing has ended, then a transition is made to PDL conversion processing by step S2801. If it is determined that processing has not ended, processing of the next band is started.

If area discrimination and attribute discrimination of the image and coding processing suited to each attribute have been concluded, the program proceeds to step S2801. Here a conversion is made to the designated PDL of the kind shown in FIG. 27 and described earlier. The result is stored in the RAM 203 as image data converted to the PDL.

Thus, image data can be converted to PDL.

<Scanner/printer operation>

The operation of the scanner/printer server 102 having the above-mentioned PDL converter circuit 227 will now be described.

[Scanner]

(Pre-scanning)

→ A read-in designation is applied by the client process 105 on the side of the host computer.

→ The designation is received by the server process 106 on the side of the scanner/printer server.

→ An image is read in from the scanner 310 of the copier 103.

→ The server 102 buffers the image data, which has been read in, in the buffer memory 209.

→ Data that has been subjected to thinning-out processing or compression processing is transferred to the host computer 101 through the network 104.

→ The client process 105 on the side of the host computer causes a monitor (not shown) to display thinned-out data or compressed image data that has been decompressed.

The image read in by the copier 103 through the foregoing operation is received by the host computer 101.

(2) Character-recognition scanning

→ The image data obtained by the pre-scanning (1) undergoes character-area designation and reading in of the image from the client process 105 is designated again.

→ Reading in is designated by the server process 106 on the side of the scanner/printer server.

→ The designated area is read in by the scanner 310 of the copier 103.

→ The server 102 buffers the read image data in the buffer memory 209.

→ The character areas of the buffered image data are subjected to character segmentation.

→ Character coding is performed by the character recognition circuit 210.

→ The character codes are accumulated in the RAM 203.

→ The character codes are transferred to the host computer 101 through the network 104.

By performing the foregoing operation, an image is read in by the copier 103, characters are recognized and the results are received by the host 101.

The processing described below can be added to the character-recognition scanning operation set forth above.

❶ When characters are segmented from the buffered image data, character color or background color is detected, characters of a designated color or of a color other than that designated are recognized, the characters are coded and the codes are transferred to the host computer.

❷ By segmenting a character from the buffered character image, character position is detected, this is added on to the character code and the result is transferred to the host computer 101.

❸ By segmenting a character from the buffered character image, character position is detected, the character code and position information obtained are converted into the form of page description language and the result is transferred to the host computer 101.

❹ The type of font and the size of character code resulting from character recognition are detected, after which the type of font and size are changed by a designation made in advance from the host computer 101.

⑤ The character image read in is held in the server 102 in the form of page description language, this is combined with image data (a natural scene or the like) obtained by scanning the image data again and the result is transferred to the host computer 101.

⑥ The character image read in is held in the server 102 in the form of page description language, this is combined with image data, which is obtained by scanning the image data again, after this image data is compressed, and the result is transferred to the host computer 101.

⑦ The items of character image data, graphic data and image data are converted into page description language and the result is transferred to the host computer 101 together with the character data. With regard to the processing performed by the PDL converter, designation of a character area, graphic area or an area that is an image area is unnecessary, as already described. The areas of each of these image types are discriminated by the area discriminating procedure in the manner set forth above. Also in a case where only characters are recognized, character areas can be recognized and therefore area designation need not be made from the host.

The foregoing operations also can be performed. In a case where the printer of the copier 103 is used, or in a case where the server 102 is used as a character-recognition/teletext communication server, the server 102 operates in the same manner as the first embodiment.

<Packet configuration (FIG. 21A and 21B)>

The addition of the PDL converter circuit is accompanied by addition of a new field to the configuration of the pre-scanning packet shown in FIG. 16A and scanning packet shown in FIG. 16B.

FIG. 21A illustrates the configuration of pre-scanning packet, and FIG. 21B shows the configuration of a scanning packet. The PDL field is added to the pre-scanning packet and scanning packet. The fields other than the added PDL field are the same as those of the first embodiment. The other packets are the same as those of the first embodiment. Accordingly, only the PDL field will be described.

The PDL field is a field for setting data which determines whether a conversion to PDL is to be designated with regard to the scanned data. The data is set to "0" when a PDL conversion is not carried out. In a case where PDL conversion is performed, a value predetermined for each type of PDL is set. For example, "1" is set if CaPSL is used as the PDL and "2" is set if PostScript is used as the PDL.

Using this packet, the host computer 101 executes the message-exchange procedure illustrated in FIG. 13, thereby instructing the server 102 of the PDL conversion of the image data.

If a copier that is constructed and functions in the above-described manner and its server system are used, the following effects are obtained:

(1) The copier can be combined with a scanner/printer server, which is capable of performing character recognition, and can be used as a common resource in a network. In other words, the network user is capable of sharing the server function as well as the copier.

(2) A character-image original is read from the scanner and a character code is obtained. As a result, the amount of data is reduced and the load upon the network diminished, thereby raising the processing speed of the computer and improving operability.

(3) The character-image original read in by the scanner can be converted into page description language automatically.

(4) A colored character-image original can be read in and characters of a designated color can be extracted from the original.

(5) The type and size of characters in the character-image original that has been read in can be changed and then printed.

(6) The character-image that has been read in can be subjected to character recognition, converted into character codes and translated automatically.

(7) The host computer in the network is capable of utilizing only the character recognition function of the server.

(8) A character-image original is subjected to character recognition and can either be sent to a public switched telephone network or received as a character code and then printed.

(9) An image read in by the scanner is converted into PDL, thereby making it possible to reduce the amount of image data. Further, the memory required for the image data can be reduced and the time required for transferring the image data can be shortened.

As many apparently widely different embodiments of S the present invention can be made without departing from the spirit and scope thereof, it is to be understood that the invention is not limited to the specific embodiments thereof except as defined in the appended claims.

What is claimed is:

1. An image processing apparatus comprising:

communication means for sending and receiving data via a communication network;

input means for inputting an original image including a character image;

character image extraction means for extracting the character image from the original image;

character recognition means for recognizing the extracted character image and converting the character image into a character code in accordance with a result of the recognition;

coding means for converting the character code and a position from which the character image is extracted into code data, described in a page description language which is interpretable by another apparatus connected to said communication network, so that a character image represented by the character code is outputted at a position corresponding to the position from which the character image is extracted, and control means for controlling said communication means to send the code data converted by said coding means to said another apparatus.

2. The apparatus according to claim 1, wherein said coding means has compressing means for compressing data corresponding to the input original image.

3. The apparatus according to claim 1, further comprising output means for outputting an image based upon the code data.

4. The apparatus according to claim 3, wherein said input means and output means are a scanner and a printer, respectively.

5. The apparatus according to claim 1, wherein said coding means codes image data received by said communication means.

6. The apparatus according to claim 1, wherein said coding means codes image data inputted by said input means.

7. The apparatus according to claim 1, further comprising generating means for generating an image based upon code data, wherein said generating means generates image data, based upon the code data and their positions received by said communication means.

8. The apparatus according to claim 7, wherein said generating means generates the image data based upon command data received by said communication means.

9. The apparatus according to claim 1, wherein said coding means converts the recognized character image into code data based upon command data received by said communication means.

10. The apparatus according to claim 1, further comprising:
pre-input means for inputting the original image prior to inputting by said input means and displaying the image inputted by said pre-input means; and
designation means for designating areas in which a character image is recognized in the pre-inputted image;
wherein said recognition means recognizes a character image in the area designated by said designation means.

11. The apparatus according to claim 10, wherein said pre-input means thins the original image and displays the thinned image.

12. The apparatus according to claim 1, further comprising translation means for translating sentences which consist of the recognized character codes to target sentences which consist of target character codes;
wherein said control means controls said communication means to send the translated character codes to said other apparatus to which the page description language corresponds.

13. An apparatus according to claim 1, wherein said input means inputs the original image by an image scanner.

14. An apparatus according to claim 1 further comprising:
a printer engine which prints an image based upon the character codes described by the page description language data received via said communication means.

15. The apparatus according to claim 1 further comprising a memory for storing the code date converted by said coding means.

16. The apparatus according to claim 15, wherein said control means controls said communication means to send the code data stored in said memory.

17. The apparatus according to claim 1, wherein said character recognition means recognizes direction of the character image, and said coding means converts the character code, the position from which the character image is extracted and the direction of the character image into code data.

18. An image processing method for an apparatus connected via communication network, comprising the steps of:
inputting an original image including a character image;
extracting the character image from the original image;
recognizing extracted character image and converting the character image into a character code;
converting the character code and a position from which the character image is extracted into code data, described in a page description language which is interpretable by another apparatus connected to the network, so that a character image represented by the character code is outputted at a position corresponding to the position from which the character image is extracted; and
sending the code data converted at said converting step to said another apparatus.

19. The method according to claim 18, wherein, in said converting step, a graphic in the image data is recognized and converted into page description language.

20. The method according to claim 18, wherein, in said converting step, a picture in the image data is recognized and converted into page description language.

21. The method according to claim 18, wherein said converting step further comprises a step of compressing the image data.

22. The method according to claim 18, further comprising the step of outputting the image data.

23. The method according to claim 22, wherein the original image is input by a scanner at said inputting step and the image is output by a printer at said outputting step.

24. The method to claim 22, further comprising a generating step of generating image data based upon the code date received via the communication network, and the generated image is output at said outputting step.

25. The method according to claim 18, wherein, in said converting step, image data received in said communicating step is converted into code data.

26. The method according to claim 18, wherein, in said converting step, image data inputted in said inputting step is converted into code data.

27. The method according to claim 18, wherein, in said converting step, the image data is converted based upon command data received via the communication network.

28. The method according to claim 18, wherein, in said generating step, the image data is generated based upon command data received via the communication network.

29. The method according to claim 18, further comprising:
a pre-inputting step of inputting the original image prior to inputting in said input step and displaying the pre-inputted image; and
a designating step of designating areas in which a character image is recognized in the pre-inputted image;
wherein, in said recognizing step, a character image in the area designated in said designating step is recognized.

30. The method according to claim 29, wherein, in said pre-inputting step, the original image is thinned and displayed.

31. The method according to claim 18, further comprising a translating step of translating sentences which consist of the recognized character codes to target sentences which consist of target character codes,
wherein, in said sending step, the translated character codes are sent to the other apparatus to which the page description language corresponds.

32. The method according to claim 18, wherein direct ion of the character image is recognized at said recognizing step, and the character code, the position from which the character image is extracted and the direction of the character image are converted into code data at said converting step.

33. A computer program product comprising a computer usable medium having computer readable program embodied in said medium, said program including process steps for:
inputting an original image including a character image;
extracting the character image from the original image;
recognizing the extracted character image and converting the character image into a character code;
converting the character code and a position from which the character image is extracted into code data, described in a page description language which is interpretable by another apparatus connected the network, so as to output a character image corresponding to the character code at a position corresponding to the position from which the character image is extracted; and sending the code data converted by said converting code means to said another apparatus.

34. An image processing apparatus comprising:

communication means for sending and receiving data via a communication network;

input means for inputting an original image including character images;

character recognition means for recognizing the character images in the original image;

coding means for converting the recognized character images into code data, described in a page description language which corresponds to another apparatus connected to the network;

translation means for translating sentences, represented by the code data of the recognized character images, into target sentences represented by target character codes; and control means for controlling said communication means to send the translated target character codes to the another apparatus.

35. An image processing method for an apparatus connected to a communication network, comprising the steps of:

inputting an original image including character images;

recognizing character images;

converting the recognized character images into code data, described in a page description language which corresponds to another apparatus connected to the network;

translating sentences represented by the code data of the recognized character images into target sentences represented by target character codes; and sending the translated target character codes to the other apparatus.

36. A computer program product comprising a computer usable medium having computer readable program embodied in said medium, said program including process steps for:

inputting an original image including character images;

recognizing character images;

converting the recognized character images into code data, described in a page description language which corresponds to another apparatus connected to the network;

translating sentences represented by the code data of the recognized character images into target sentences represented by target character codes; and sending the code data converted by said converting code means to the other apparatus.

* * * * *

UNITED STATES PATENT AND TRADEMARK OFFICE
CERTIFICATE OF CORRECTION

PATENT NO. : 5,881,168

DATED : March 9, 1999

INVENTOR(S) : MAKOTO TAKAOKA

It is certified that error appears in the above-identified patent and that said Letters Patent is hereby corrected as shown below:

ON THE TITLE PAGE

[56] RC USPD, "4,614,978 9/1986 Doster et al." should read --4,164,978 9/1986 Doster et al.--

COLUMN 2

Line 30, "possible" should read --possible to--.

COLUMN 5

Line 9, "of" (first occurrence) should read --of the--.
    Line 23, "an" should read --as--.
    Line 65, "in" should read --is--.

COLUMN 7

Line 3, "realize" should read --realize the--.

COLUMN 14

Line 25, "an d" should read --and--.

COLUMN 18

Line 11, "FIG. 16II" should read --FIG. 16H--.
    Line 22, "format the same" should read --the same format--.

UNITED STATES PATENT AND TRADEMARK OFFICE
CERTIFICATE OF CORRECTION

PATENT NO. : 5,881,168
DATED : March 9, 1999
INVENTOR(S) : MAKOTO TAKAOKA

It is certified that error appears in the above-identified patent and that said Letters Patent is hereby corrected as shown below:

COLUMN 19

Line 15, "a" should read --$\alpha$--.

COLUMN 20

Line 34, "as" should read --as a--.
    Line 47, "accordance" should read --accordance with the--.

COLUMN 23

Line 32, "can" should read --can be--.

COLUMN 27

Line 66, "method is" should read --methods are--.

UNITED STATES PATENT AND TRADEMARK OFFICE
CERTIFICATE OF CORRECTION

PATENT NO. : 5,881,168
DATED : March 9, 1999
INVENTOR(S) : MAKOTO TAKAOKA

It is certified that error appears in the above-identified patent and that said Letters Patent is hereby corrected as shown below:

COLUMN 30

Line 3, "it" should be deleted.

COLUMN 31

Line 42, "PDL,." should read --PDL,--.

COLUMN 33

Line 28, "as" should read --as in--.

COLUMN 34

Line 22, "S" should be deleted.

COLUMN 35

Line 34, "claim 1" should read --claim 1,--.
    Line 39, "claim 1" should read --claim 1,--.

UNITED STATES PATENT AND TRADEMARK OFFICE
CERTIFICATE OF CORRECTION

PATENT NO. : 5,881,168
DATED : March 9, 1999
INVENTOR(S) : MAKOTO TAKAOKA

It is certified that error appears in the above-identified patent and that said Letters Patent is hereby corrected as shown below:

COLUMN 36

Line 16, "code date" should read --code data--.
    Line 50, "direct ion" should read --direction--.
    Line 67, "connected" should read --connected to--.

Signed and Sealed this

Eleventh Day of January, 2000

Attest:

Q. TODD DICKINSON

Attesting Officer     Acting Commissioner of Patents and Trademarks